(12) United States Patent
Oh et al.

(10) Patent No.: US 11,980,316 B2
(45) Date of Patent: May 14, 2024

(54) BEVERAGE POD BREWING CHAMBER

(71) Applicants: Sung Oh, West Covina, CA (US); Guoyong Ye, Foshan (CN)

(72) Inventors: Sung Oh, West Covina, CA (US); Guoyong Ye, Foshan (CN)

(*) Notice: Subject to any disclaimer, the term of this patent is extended or adjusted under 35 U.S.C. 154(b) by 0 days.

(21) Appl. No.: 17/216,761

(22) Filed: Mar. 30, 2021

(65) Prior Publication Data

US 2021/0298517 A1 Sep. 30, 2021

Related U.S. Application Data

(60) Provisional application No. 63/002,353, filed on Mar. 30, 2020.

(51) Int. Cl.
*A47J 31/36* (2006.01)
*A47J 31/40* (2006.01)
*B65D 85/804* (2006.01)

(52) U.S. Cl.
CPC ....... *A47J 31/3633* (2013.01); *A47J 31/3628* (2013.01); *A47J 31/407* (2013.01); *B65D 85/8046* (2013.01)

(58) Field of Classification Search
CPC ............... A47J 31/3623; A47J 31/3628; A47J 31/3633; A47J 31/407; B65D 85/8046; B65D 85/8049; B65D 85/8052; B65D 85/8061
USPC .......................................... 99/295
See application file for complete search history.

(56) References Cited

U.S. PATENT DOCUMENTS

2020/0383515 A1* 12/2020 Ye .................. A47J 31/3633

* cited by examiner

*Primary Examiner* — Nathaniel E Wiehe
*Assistant Examiner* — Ket D Dang
(74) *Attorney, Agent, or Firm* — Viking IP Law; Scott R. Hansen

(57) ABSTRACT

A brewing chamber works with a pod to brew a beverage and drains the beverage from the pod without being obstructed by the brewing mechanism to substantially avoid contaminating the beverage and brewing mechanism. The pod is designed to drain the beverage once a gap is formed between an extension of an internal filter that is peelably coupled with a rim of the outer container. The brewing chamber is adapted to hold the pod in a substantially horizontal orientation where a hook slides to separate the extension from the rim to form the gap and the hook is tucked away so that the beverage may drain from the pod unobstructed by the hook.

1 Claim, 16 Drawing Sheets

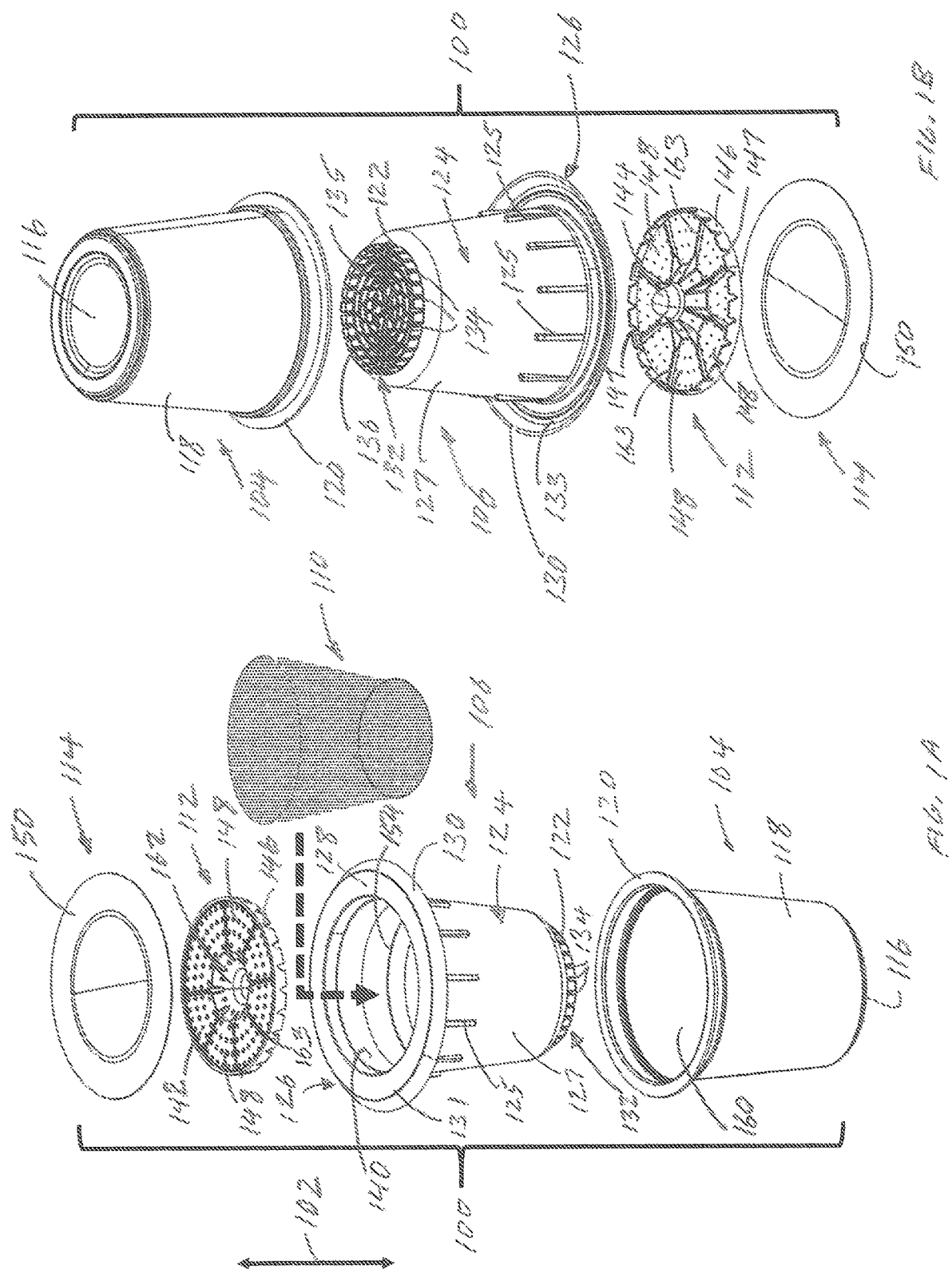

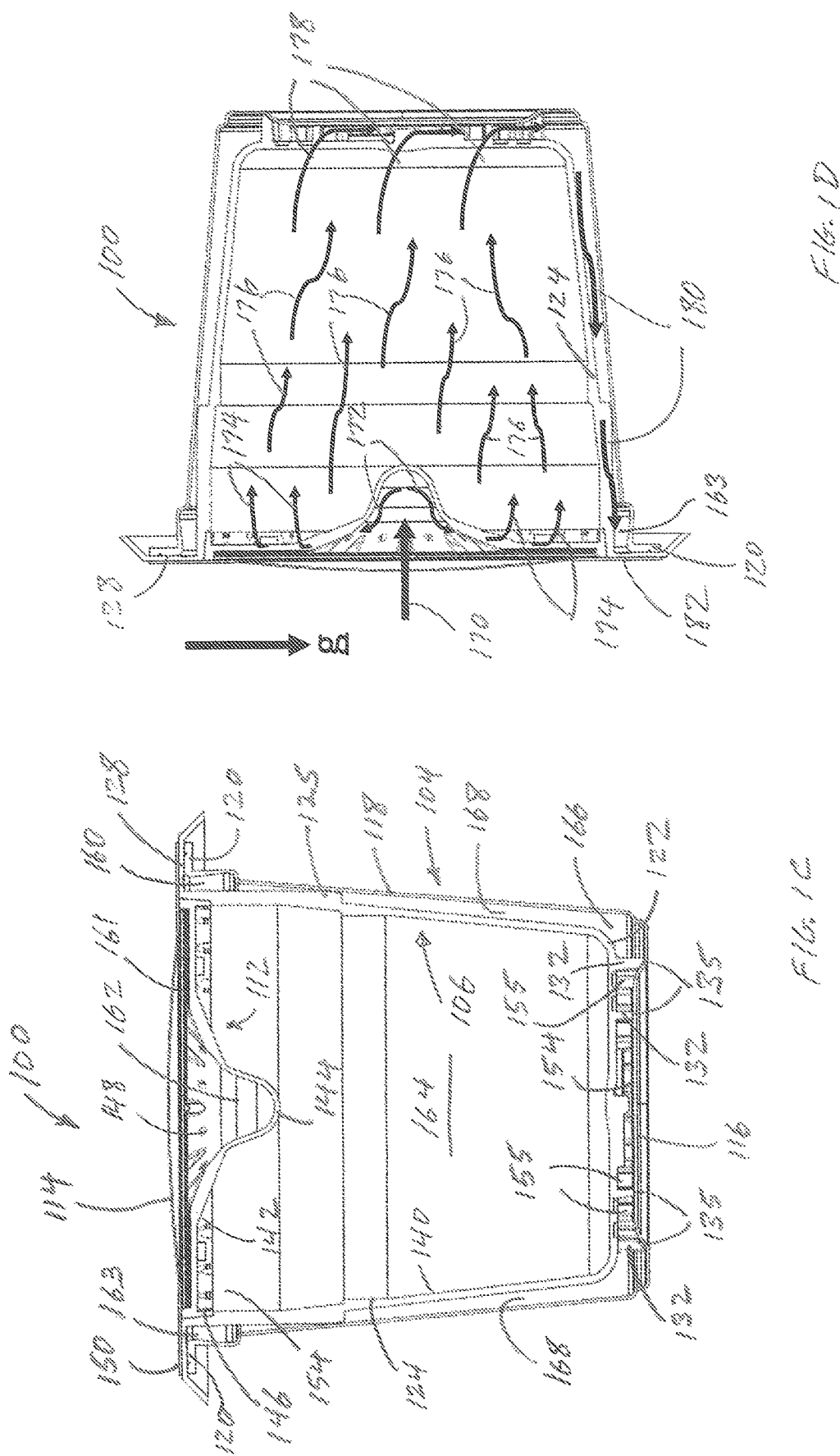

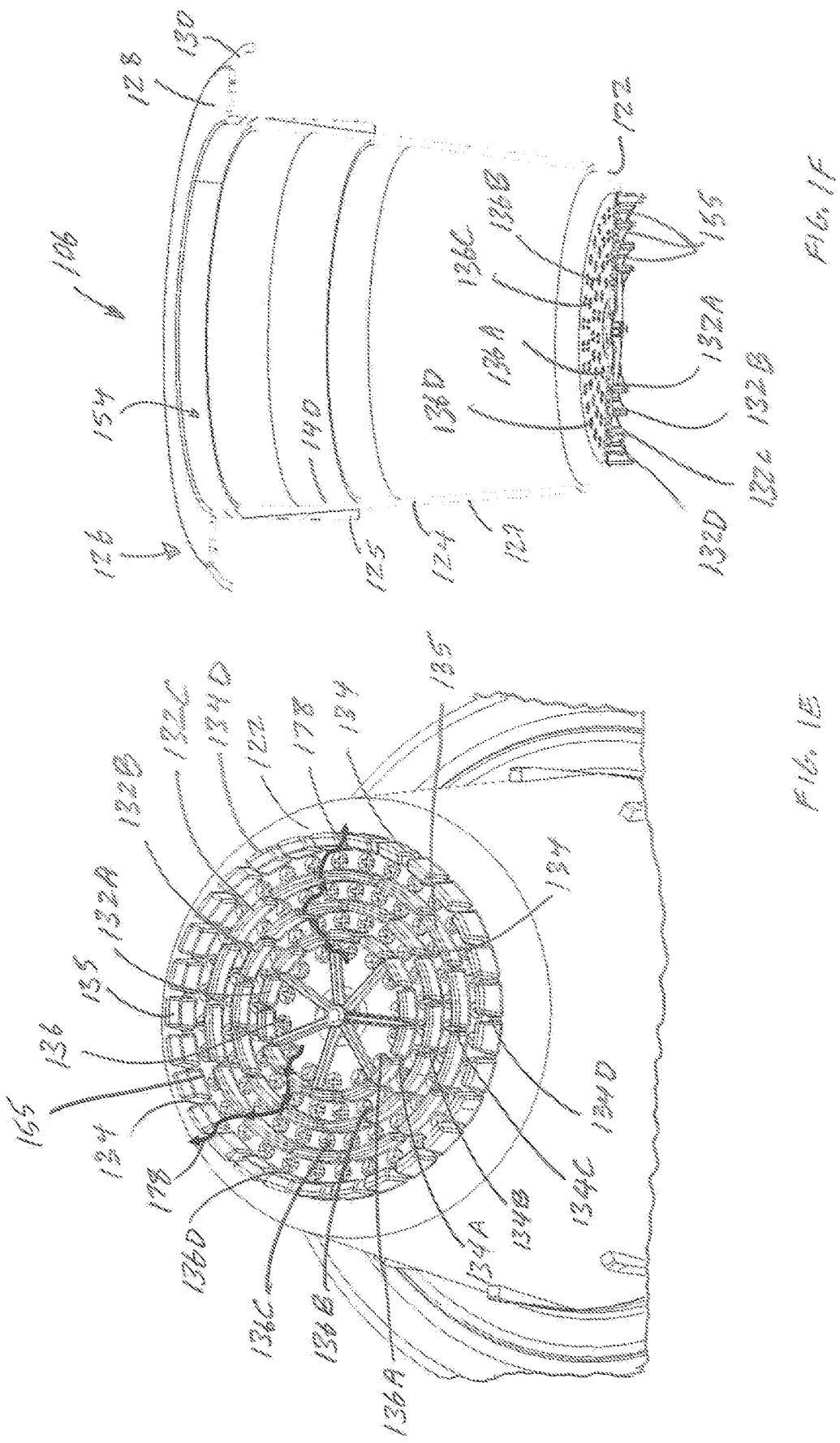

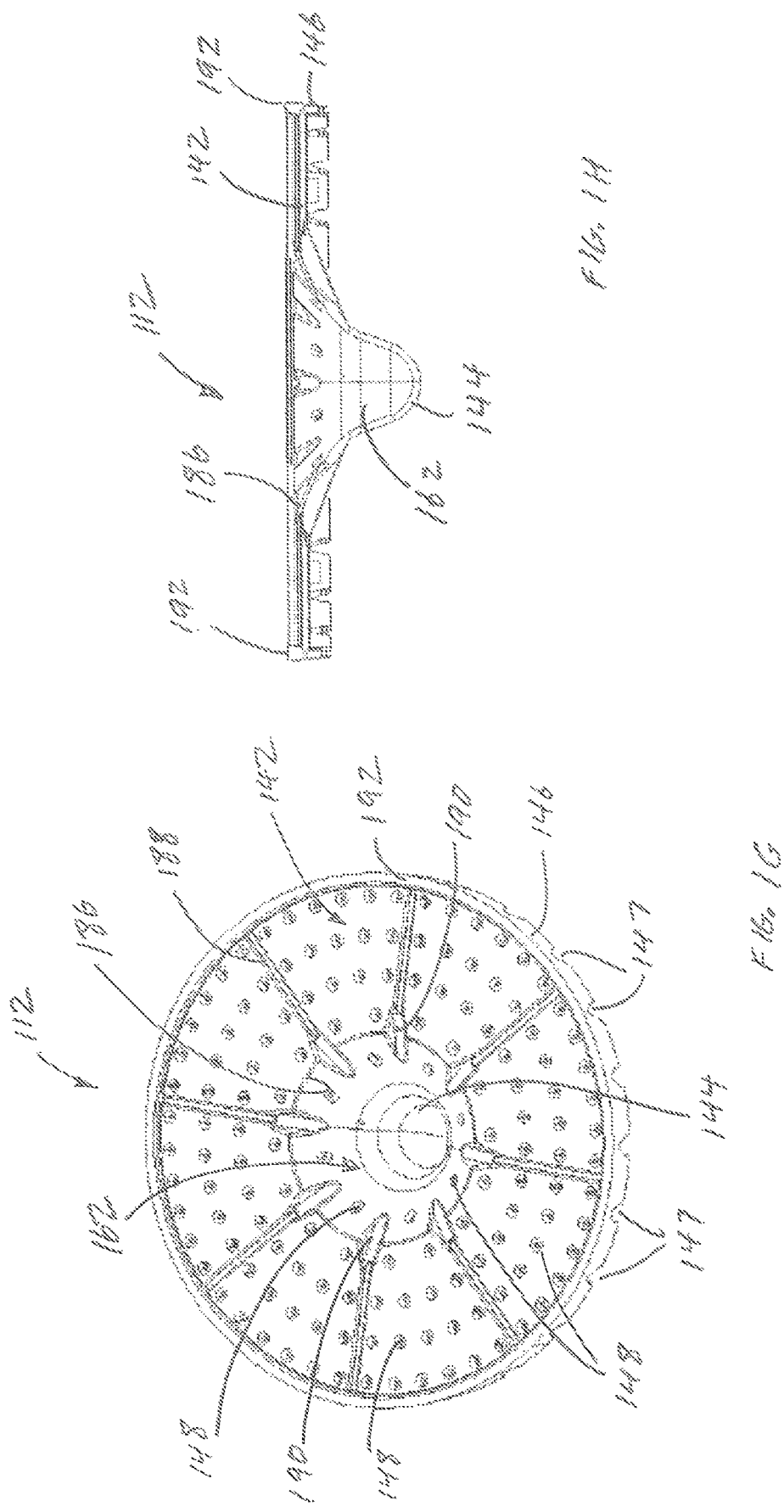

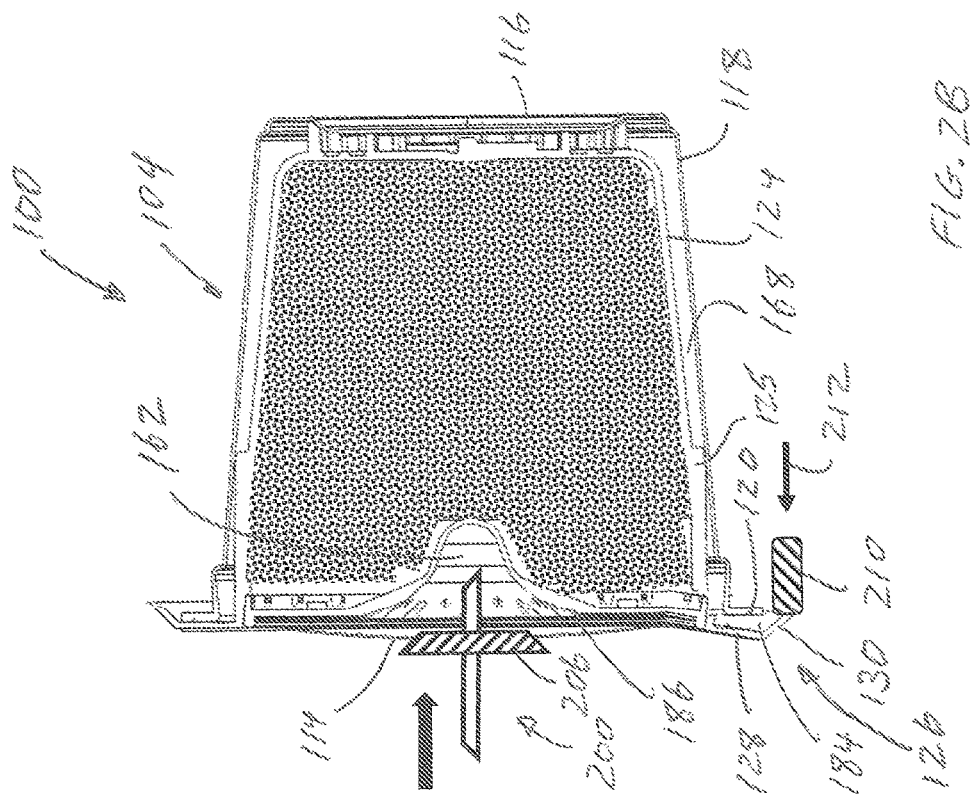
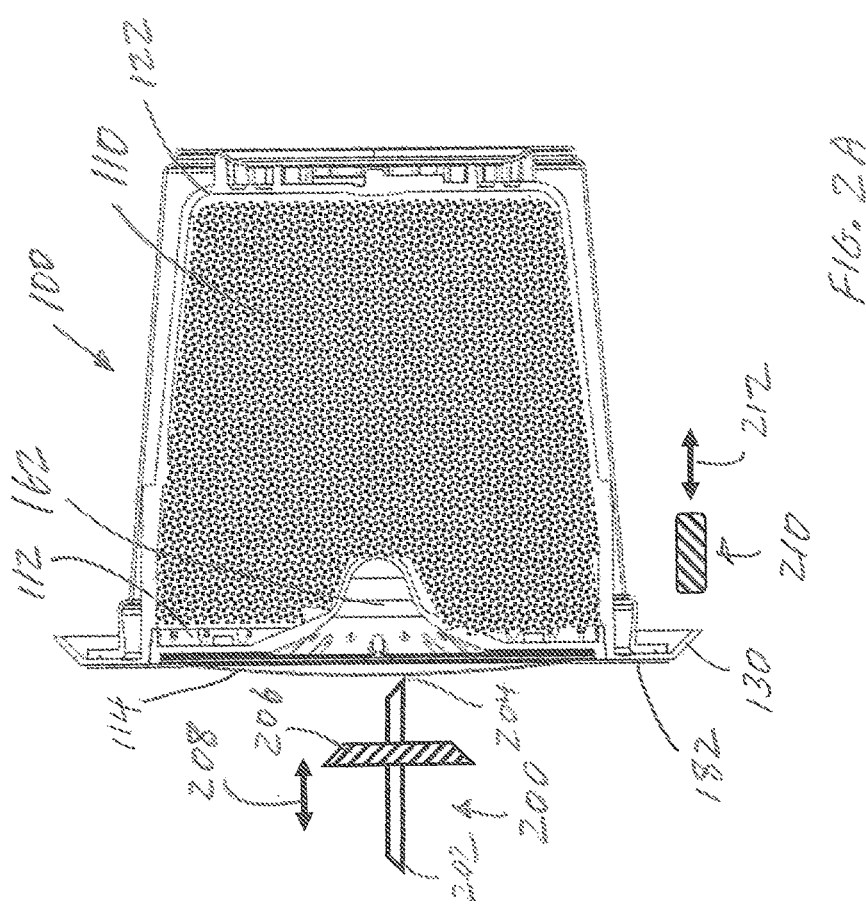

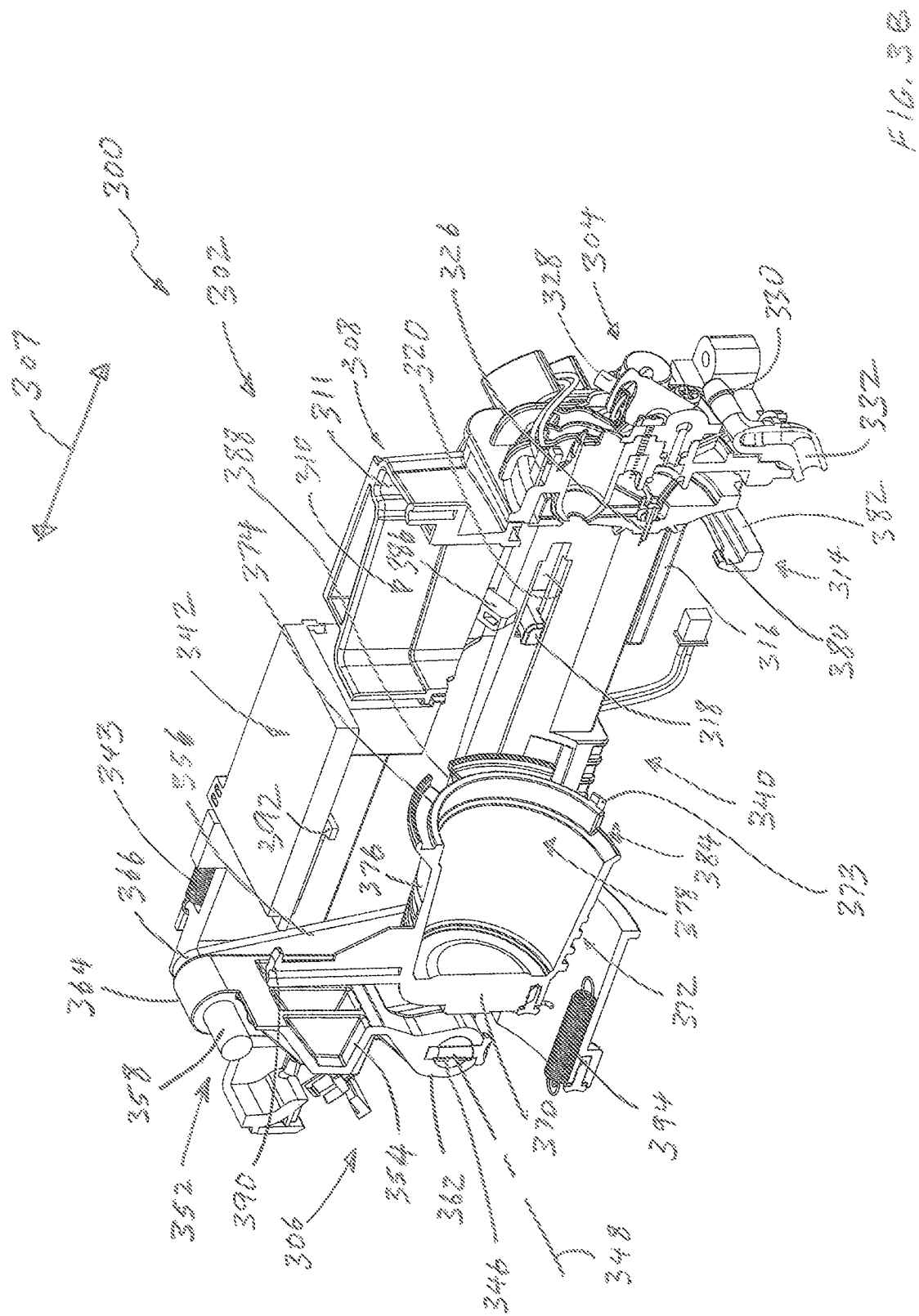

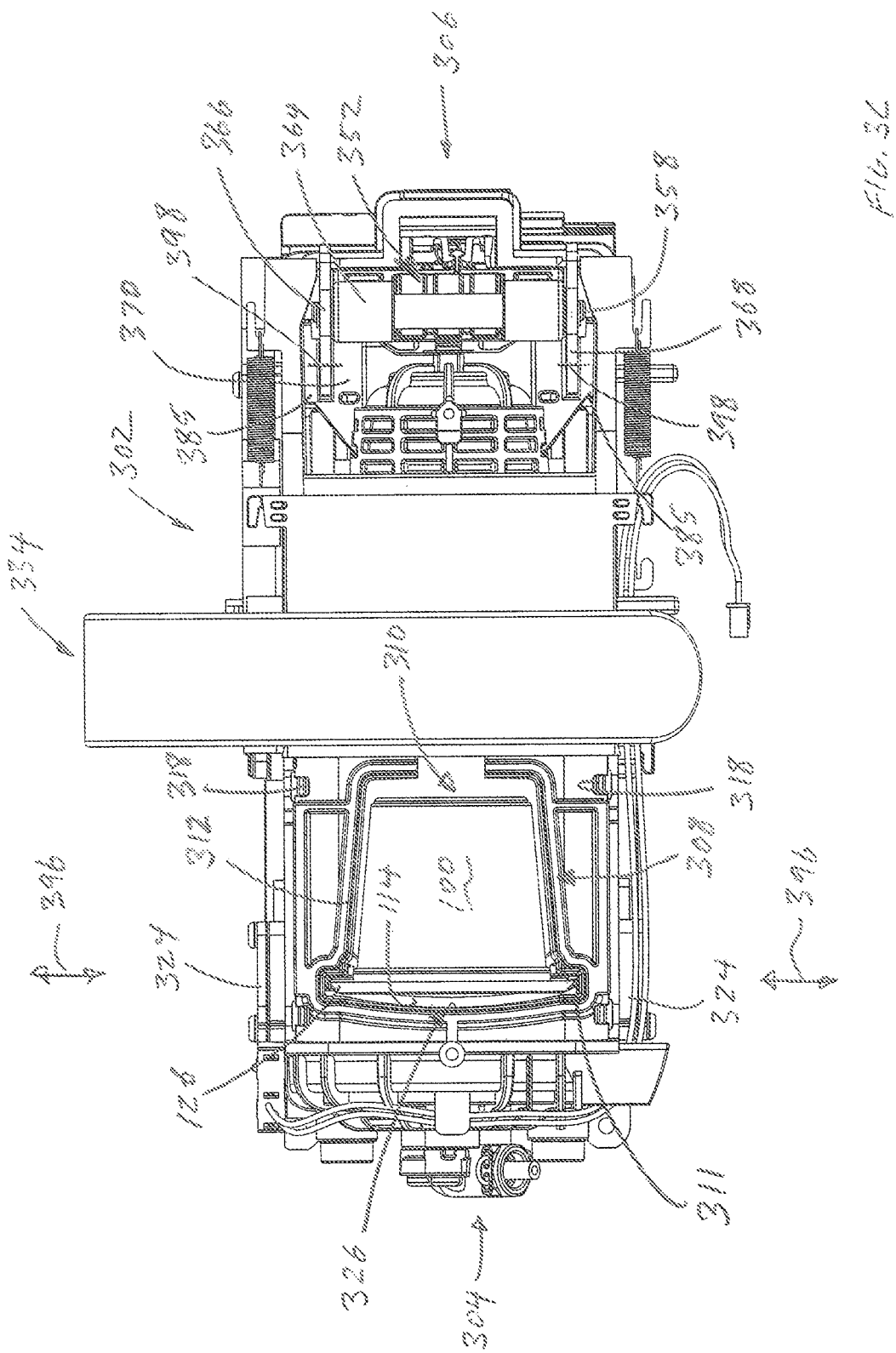

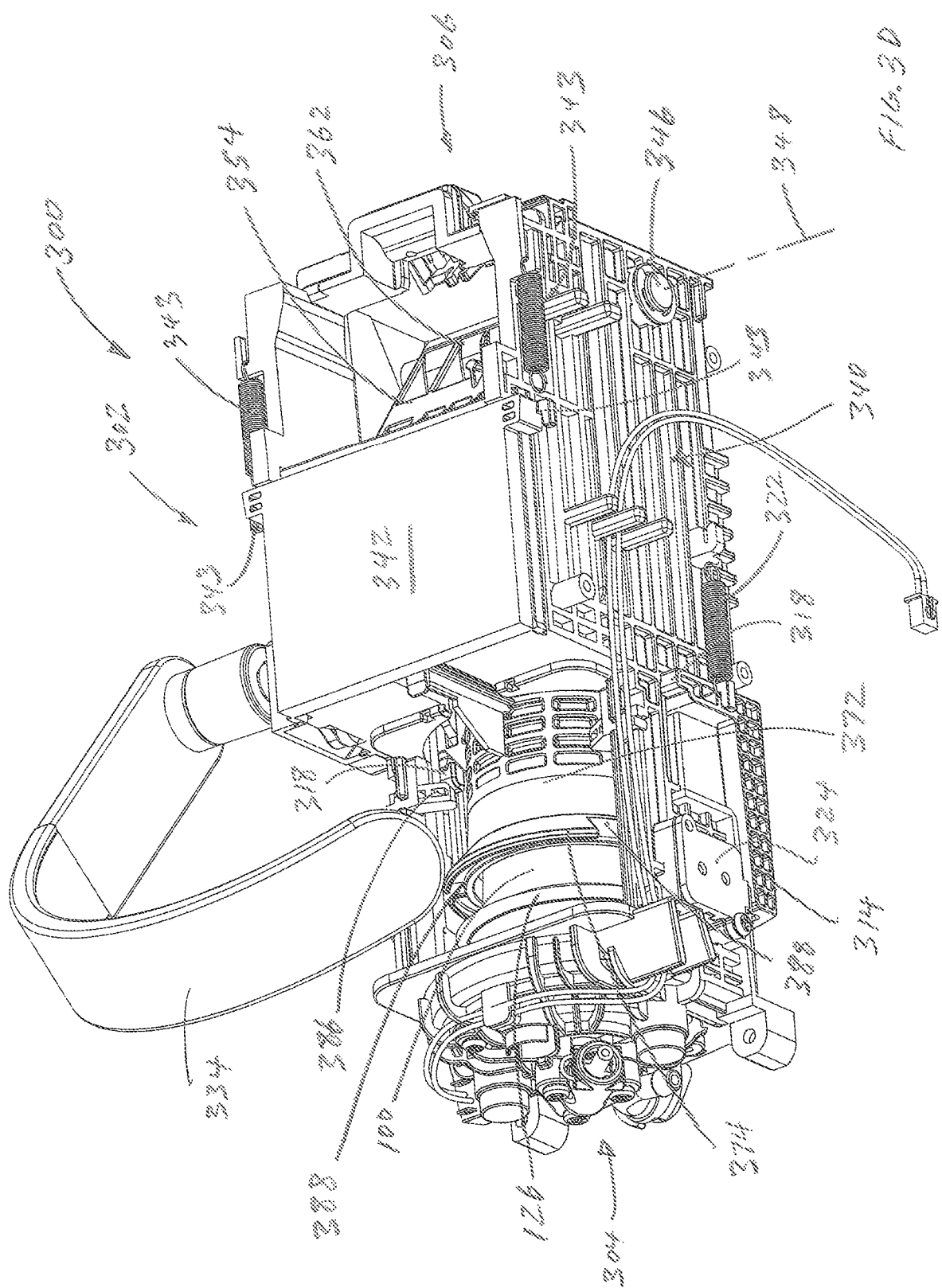

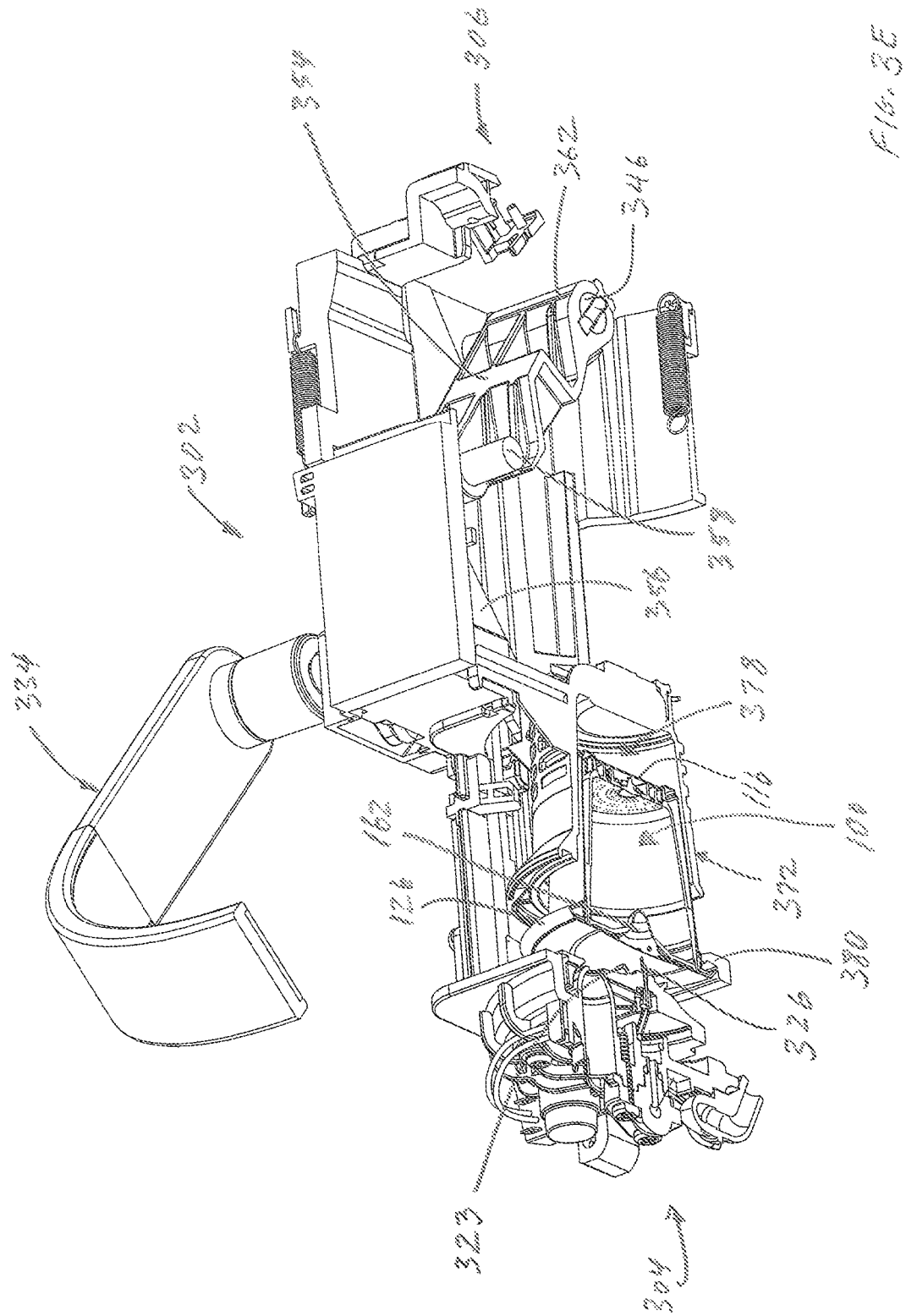

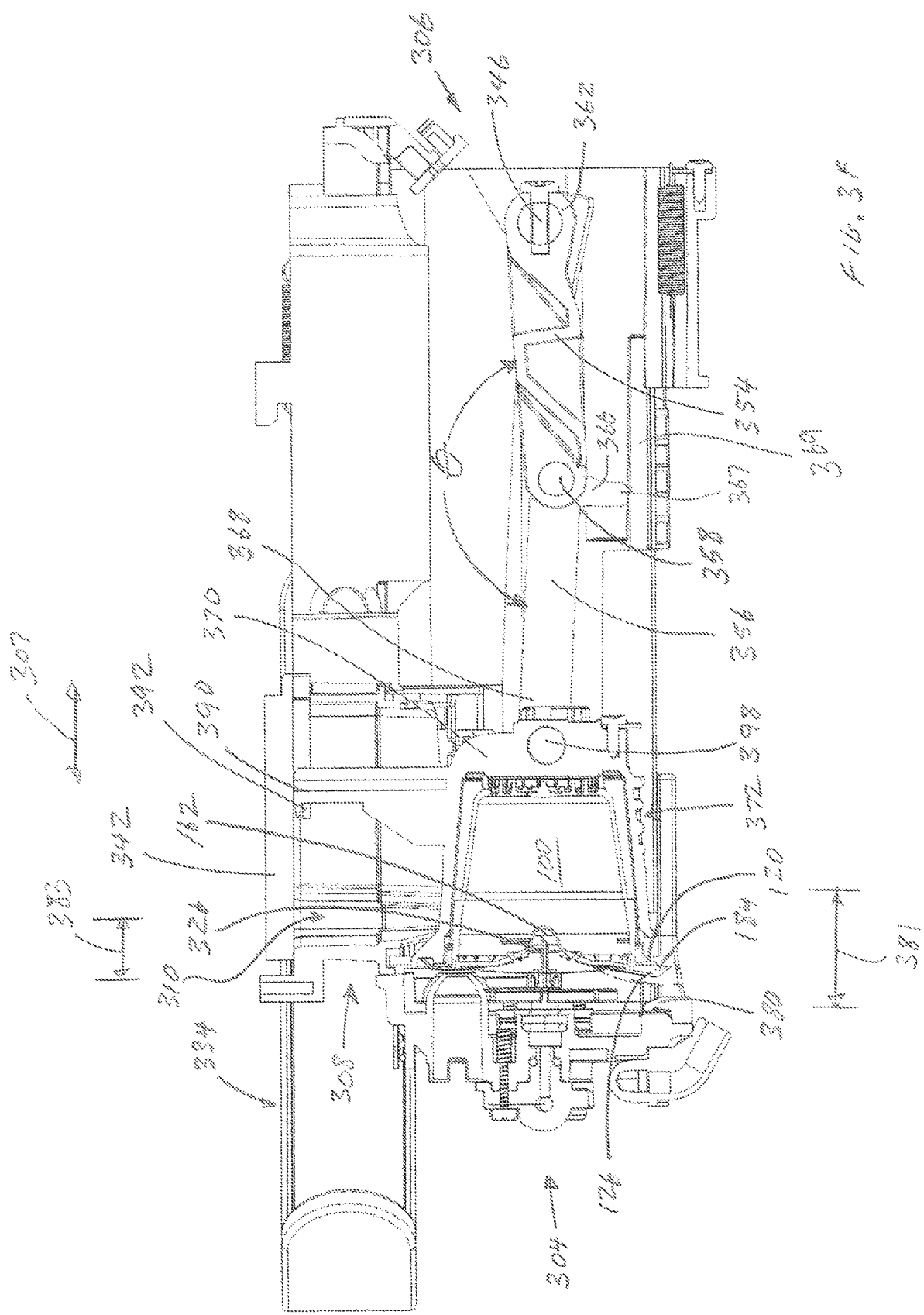

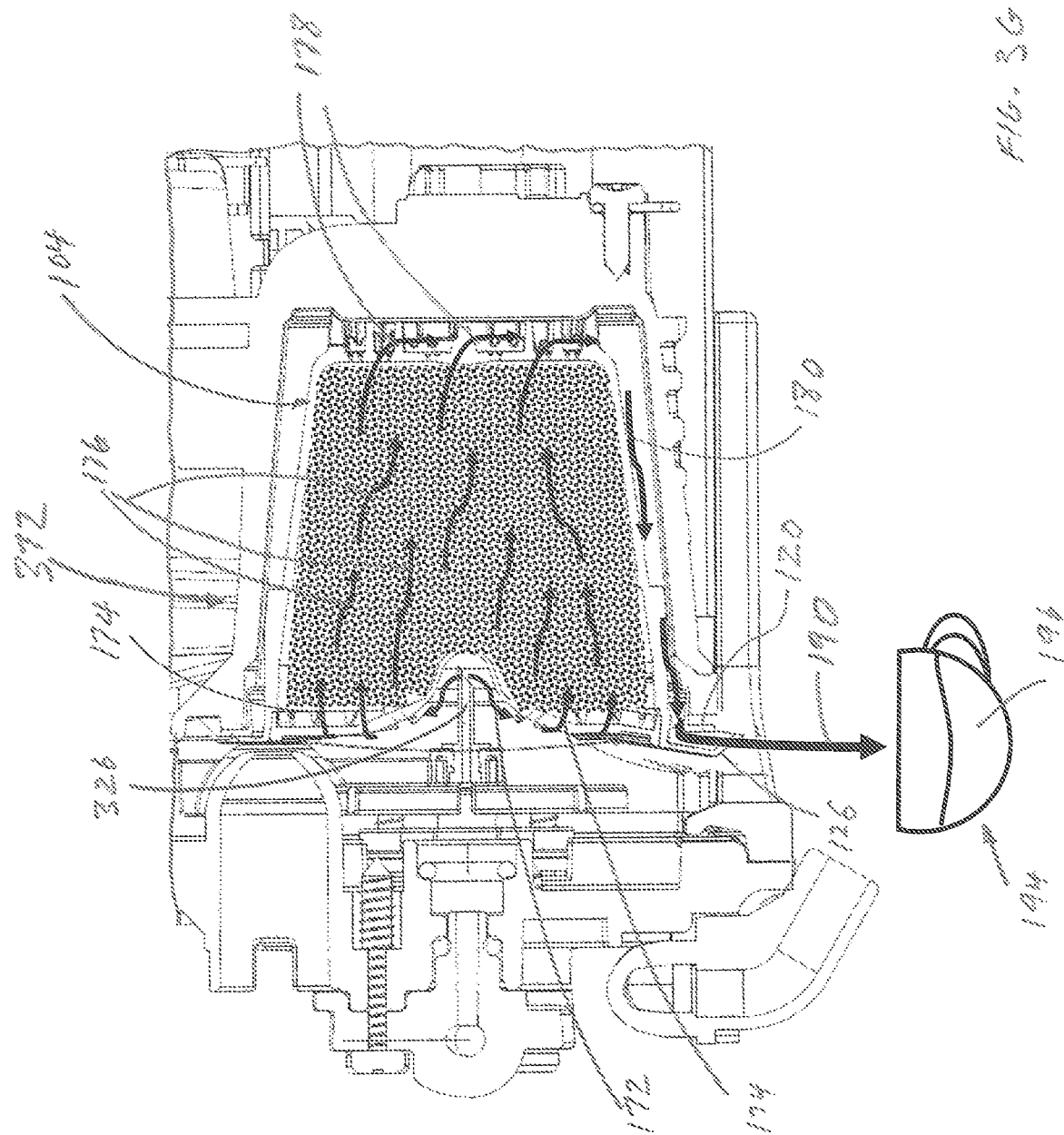

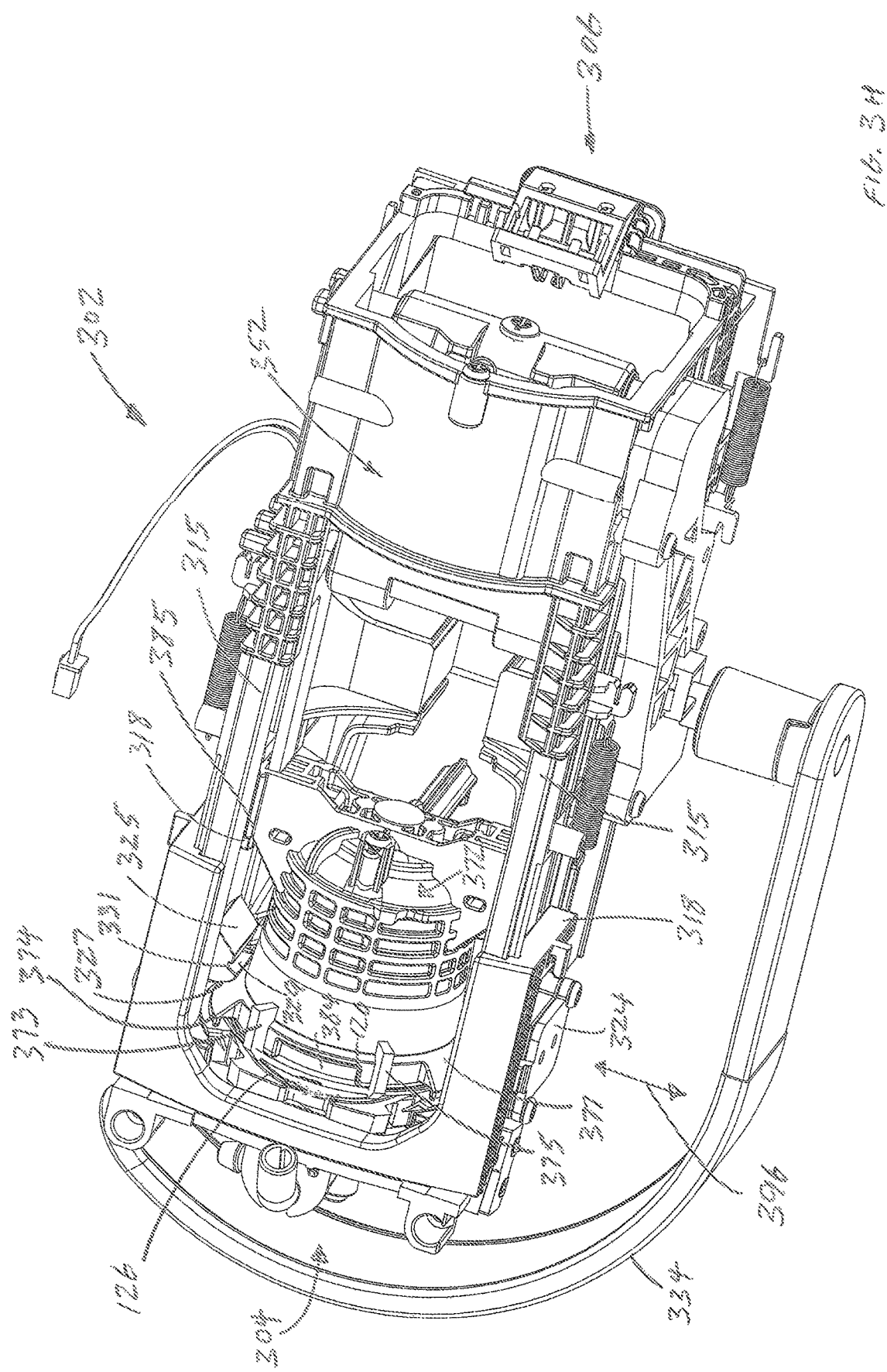

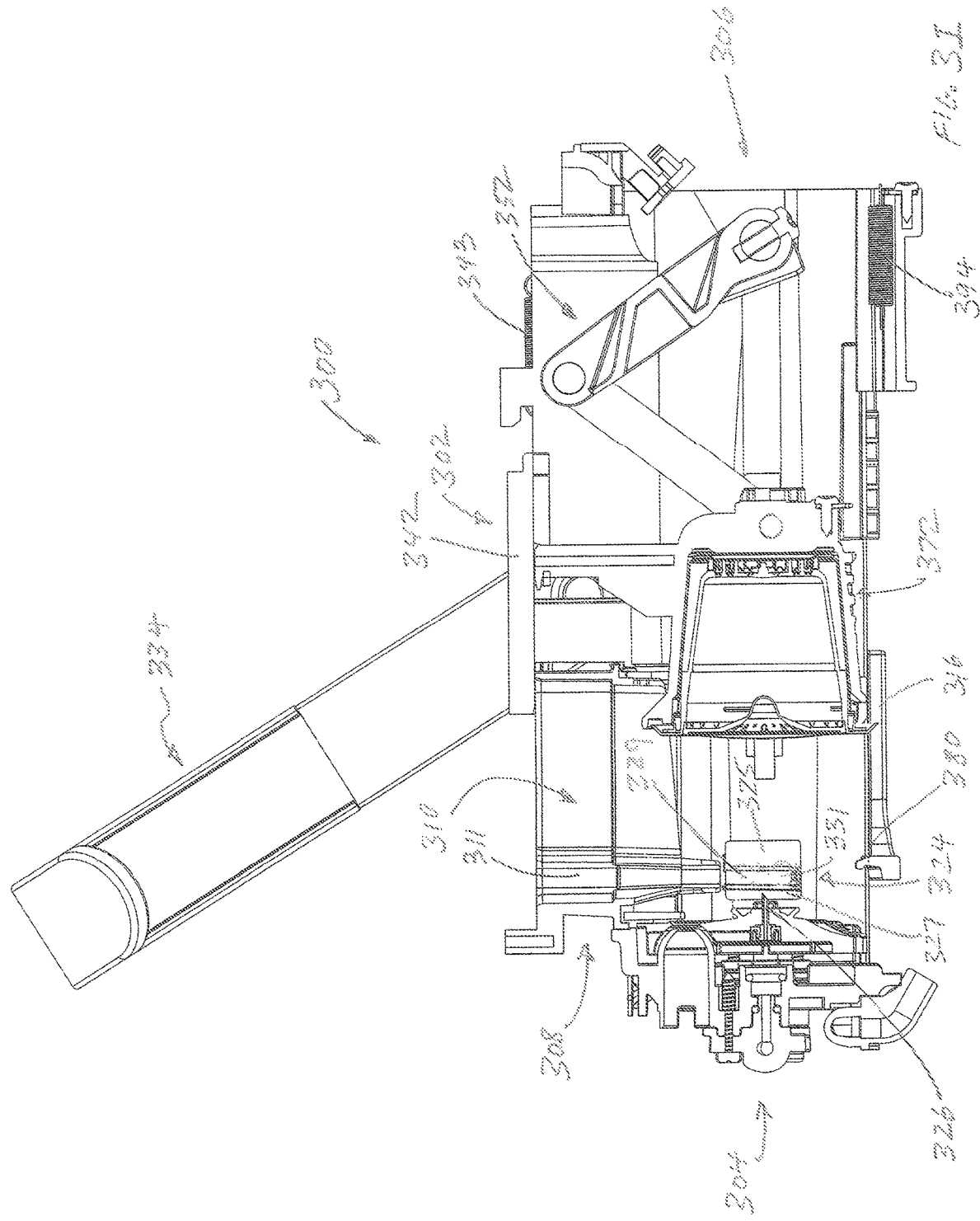

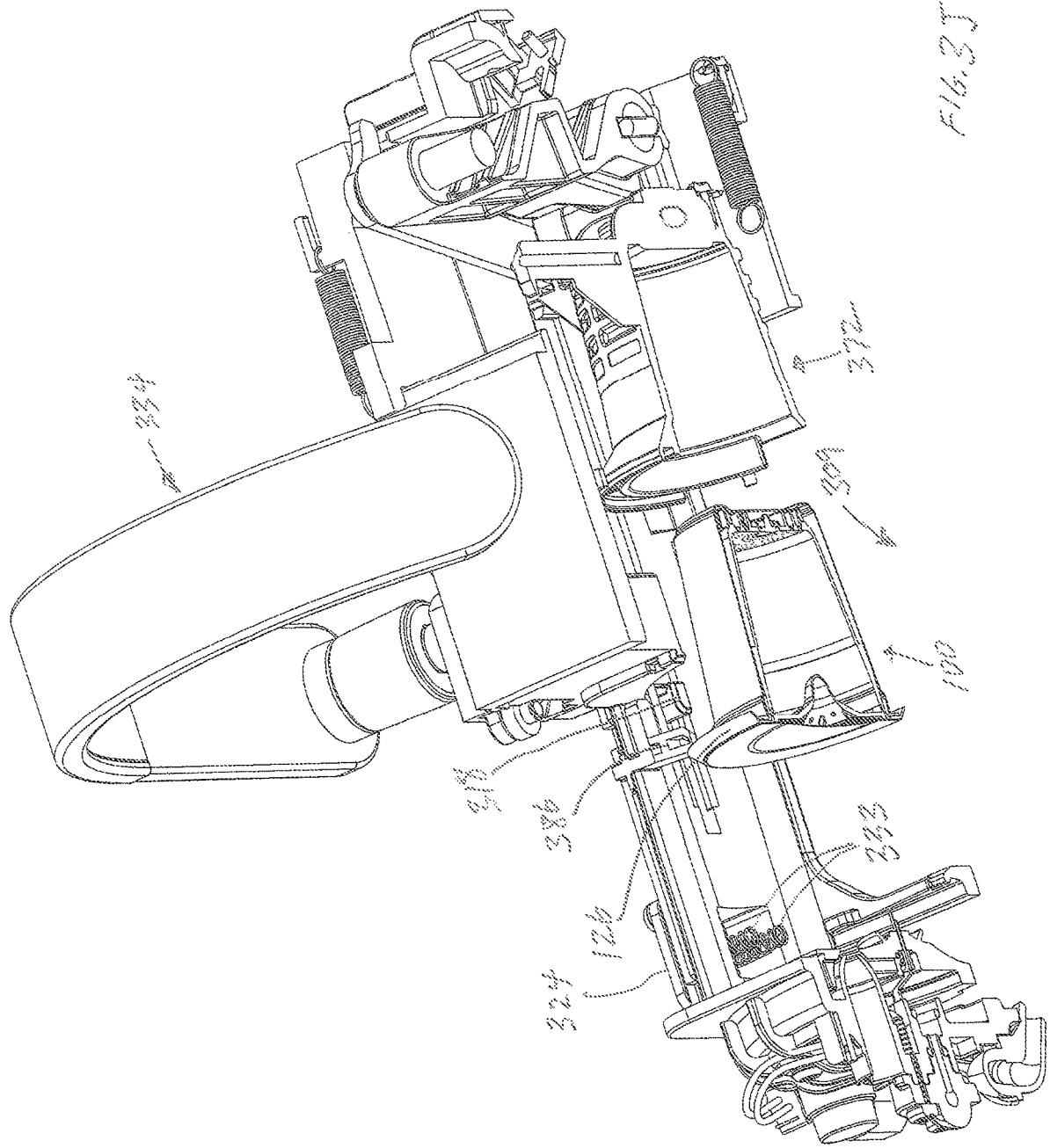

11,980,316 B2

BEVERAGE POD BREWING CHAMBER

RELATED APPLICATION

This application claims priority to a U.S. Provisional Application No. 63/002,353 filed Mar. 30, 2020, entitled "Beverage Pod Brewing Chamber," which is hereby incorporated by reference in its entirety.

BACKGROUND OF THE INVENTION

Field of the Invention

A brewing chamber may be adapted to receive a beverage pod to brew a beverage therein and drain the beverage from the pod unobstructed by the brewing chamber between the pod and a mug underneath the pod.

Background of the Invention

The following background discussion is not an admission that the matters discussed below are citable as prior art or common general knowledge. Rather, the general background information disclosed herein is directed at describing the problem(s) associated with the current state of the art, and a need for a better solution.

Single-serve pod systems for brewing beverages such as coffee and espresso are popular for their convenience and variety of different flavored beverages offered. One of the problems with such a brewing system is that as the beverage drains from the pod, the beverage can come into contact with the brewing mechanism such that the beverage and/or the brewing mechanism can be cross-contaminated, which can alter the taste of the beverage and be unsanitary. For instance, if a pod is used to brew a flavored coffee, and then an unflavored coffee is brewed, the subsequent unflavored coffee may be contaminated with a hint of the flavored coffee such that the taste of the second unflavored beverage may be undesirable. Moreover, if the brewing chamber is contaminated with coffee, which is an organic material, over time—especially during warm and moist months—bacteria and mold may grow on the brewing mechanism; and if the brewing mechanism is used without cleaning the mechanism, the subsequent beverage brewed from the pod may be unsanitary. Accordingly, there is a need for a brewing system that can drain a beverage from a pod unobstructed by the brewing mechanism to substantially reduce cross-contamination.

INVENTION SUMMARY

One of the aspects of the invention is to provide a brewing chamber that works with a pod adapted to drain the beverage from the pod without obstructing the flow of beverage to minimizes cross-contamination. In this regard, a brewing chamber may be adapted to be in a retraced position and an extended position, the brewing chamber may be adapted to receive a pod in the retracted position and form a gap between an extension of a filter and a rim of an outer container as the brewing chamber goes from the retracted position to the extended position, the brewing chamber comprising: a retaining member having a recess adapted to receive the extension of the pod and holds the pod in a substantially horizontal position in the retracted position; and a hook adapted to move between the retracted position and the extended position, the hook juxtaposed to an underside of the extension in the retracted position when the retaining member receives the pod, and when the hook moves from the retracted position to the extended position, the hook engages with the underside of the extension to separate the extension from the rim to form a gap therebetween.

In addition, a method of brewing a beverage may be provided with respect to a proximal end and a distal end from a pod having a longitudinal axis, the pod adapted to drain a beverage from a gap formed between an extension of a filter and a rim of a container, the method comprising: (i) retaining the pod to orient the longitudinal axis of the pod in a substantially horizontal position; (ii) moving the pod towards the proximal end at a first travel distance to allow an inlet member to penetrate into the pod; and (iii) moving a hook towards the proximal end at a second travel distance that is farther than the first travel distance to engage with an underside of the extension to form a gap between the extension and the rim.

BRIEF DESCRIPTION OF THE DRAWINGS

The invention can be better understood with reference to the following drawings and description. The components in the figures are not necessarily to scale, emphasis is instead placed upon illustrating the principles of the invention. Moreover, in the figures, the referenced numerals designate the corresponding parts throughout the different views.

FIG. 1A shows an upright expanded perspective view of a pod along a longitudinal axis.

FIG. 1B shows an inverted expanded perspective view of the pod of FIG. 1A.

FIG. 1C shows a cross-sectional view of the assembled pod without the beverage ingredient.

FIG. 1D shows a cross-sectional view of the assembled pod in a brewing orientation.

FIG. 1E illustrates an enlarged view of the retainer walls protruding from the base of the filter.

FIG. 1F shows a cross-sectional view of the filter illustrating the holes in the base, and the retainer walls extending underneath the base, separated from each other.

FIG. 1G shows an enlarged perspective view of the distributor.

FIG. 1H shows a cross-sectional view of the distributor where a portion of the flap extends upwards.

FIG. 2A shows a cross-sectional view of the pod in a brewing orientation juxtaposed to an inlet member and a detaching member.

FIG. 2B shows a cross-sectional view of the pod with the inlet member piercing through the lid and the detaching member separating the extension of the filter from the rim of the container to form a gap therebetween.

FIG. 3B shows a cross-sectional view of the brewing chamber of FIG. 3A.

FIG. 3C shows a top view of the brewing chamber of FIG. 3A with a pod within the brewing chamber.

FIG. 3D shows a perspective view of the brewing system in a partially closed position.

FIG. 3E shows a cross-sectional view of the brewing chamber of FIG. 3D.

FIG. 3F shows a cross-sectional view of the brewing chamber in a fully extended position.

FIG. 3G shows an enlarged view of the holder area to illustrate the manner in which the beverage may be brewed within the pod and drained therefrom unobstructed by the brewing chamber.

FIG. 3H shows the underside of the brewing chamber with the holder in the fully extended position.

FIG. 3I shows a cross-sectional view of the brewing chamber of FIG. 3F returning to a partially open position.

FIG. 3J shows a cross-sectional view of the brewing chamber of FIG. 3F returning to a fully retracted position.

DETAILED DESCRIPTION OF THE INVENTION

Figure 2D:
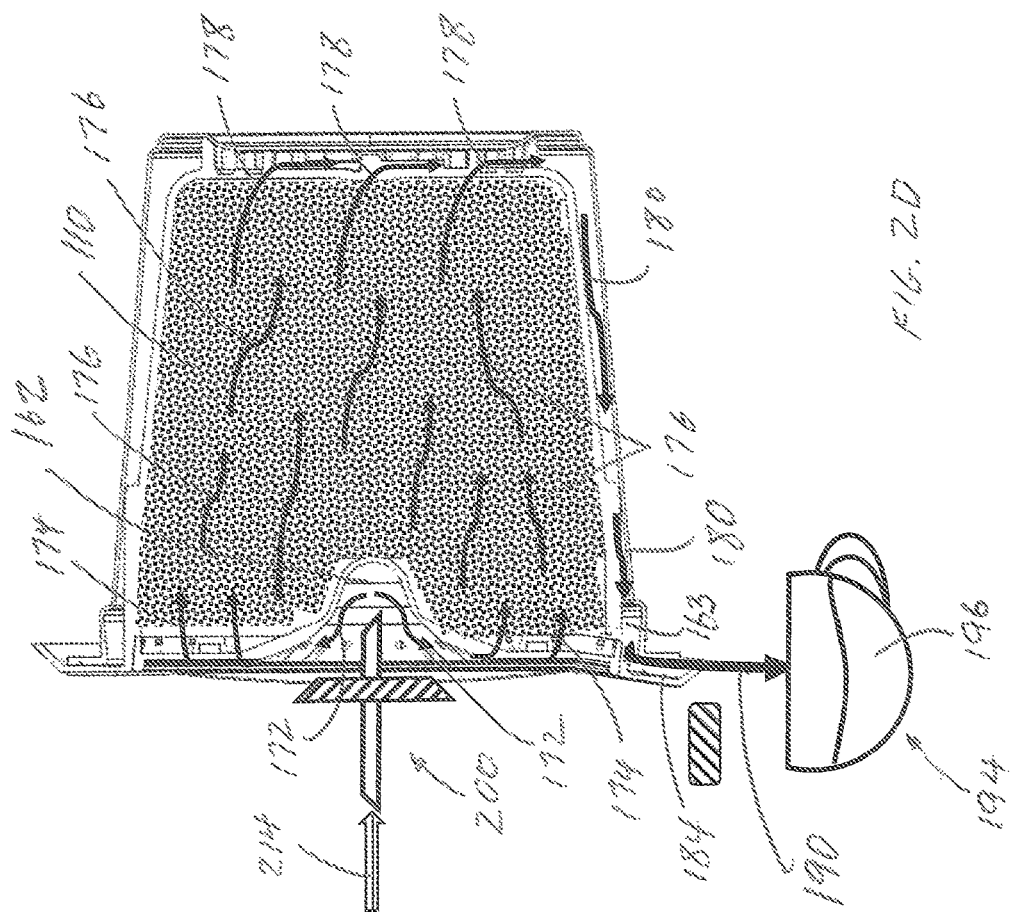
FIG. 2D shows the pod brewing in a substantially horizontal position and draining the beverage unobstructed by the brewing mechanism.

The various aspects of the invention can be better understood with reference to the drawings and descriptions described below. The components in the figures, however, are not necessarily to scale, and emphasis is instead placed upon illustrating the principles of the various aspects of the invention. The claimed invention is not limited to apparatuses or methods having all of the features of any one apparatus or method described below or to features common to multiple or all of the apparatuses described below. The claimed invention may reside in a combination or subcombination of the apparatus' elements or method steps described below. It is possible that an apparatus or method described below is not an example of the claimed invention. In general, when the terms "may", "is", and "are" are used as a verb in the description corresponding to a particular subject matter, these terms are generally used in this disclosure as an expression of a possibility of such subject matter rather than as a limiting sense such as when the terms "shall" and "must" are used. For example, when the description states that the subject matter "may be" or "is" circular, this is one of many possibilities, such that the subject matter can also include an oval, square, regular, irregular, and any other shapes known to a person ordinarily skilled in the art rather than being limited to the "circular" shape as described and/or illustrated in the corresponding referenced figure(s). In addition, when the term "may", "is", and "are" are used to describe a relationship and/or an action, these terms are generally used in this disclosure as an expression of a possibility. For example, when the description states that a subject matter A "may be" or "is" adjacent to a subject matter B, this can be one of many possibilities including the possibility that the subject matter A is not adjacent to the subject matter B or that the subject matter A may be connected, coupled, or engaged with the subject matter B as it would be understood by a person ordinarily skilled in the art.

Moreover, it is within the scope of the invention to combine the various embodiments disclosed relating to one or more particular drawings and their corresponding descriptions with one or more of the other drawings and their corresponding descriptions disclosed herein and/or other references incorporated herein by reference where such a combination may be combined and practiced by one ordinarily skilled in the art. The phrase "single-serve beverage pod" or "beverage pod" or the like in this disclosure generally refers to a single brewing process where a desired volume of beverage is brewed to serve one cup of beverage, however, it is within the scope of the invention to have a pod that packs sufficient beverage substance to brew multiple cups of beverage from a single brewing process or from multiple brewing processes. Also, the term "beverage substance" or "beverage ingredient" or the like generally refers to the underlying article when mixed with liquid such as water, formulates a beverage such as coffee, tea, fruit drinks, punch, lemonade, soda, cocoa, milk, soup, energy drink, liquid medicine, cannabis, and the like. For instance, for coffee, the beverage substance may be coffee ground, instant powder coffee, and/or concentrated coffee in liquid form that can be diluted with water for consumption. For tea, the beverage substance may be tea ground, instant powder tea, and/or concentrated tea in liquid form that can be diluted with water for consumption. For baby milk, the beverage substance may be milk powder or concentrated milk liquid. For medicine such as for the flu or cold, the beverage substance may be in the powder or liquid form which can be dissolved with a predetermined portion of the heated water to brew a proper portion of the liquid medicine. Cannabis may be also provided in dried ground or powder form. In addition, the beverage substance may be provided in the form of pellets that are infused with desired flavors; and once the pellets are exposed to liquid such as water, the trapped flavors may be released by the pellets, which are then absorbed by the mixing liquid to formulate a beverage with the desired flavor. As such, the beverage substance may be in the form of ground, powder, liquid, pellets, and the like; and the beverage substance may be formulated from single or multiple ingredients. The same referenced numerals referred to in the drawings and descriptions generally correspond to the same or similar parts throughout the disclosure.

FIG. 1A shows an upright expanded perspective view of a pod 100 along a longitudinal axis 102 configured to brew beverages such as coffee and espresso; and FIG. 1B shows an inverted expanded perspective view of the pod 100 along the axis 102 to show the top and bottom views, respectively, of the various components of the pod 100. The pod 100 may include a container 104, a filter 106 adapted to receive beverage ingredient 110, a distributor 112, and a lid 114. The container 104 may have a base 116 that extends upwardly to form a sidewall 118 and then extends outwardly to form a rim 120 defining an opening 160. The container 104 may be formed from a variety of materials and from single or multilayered sheets sandwiched together to form a hermitically sealed barrier to protect the beverage ingredients contained therein from atmospheric oxygen entering the container. The container may be formed from a variety of materials known to one skilled in the art. In this regard, the container 104 may be formed in a manner described in U.S. Pat. No. 10,336,498 (the "'498 patent") issued Jul. 2, 2019, entitled "CONTAINER WITH IMPROVED PUNCTURE-ABILITY", by Foster et al., which is hereby incorporated by reference in its entirety. In particular, the container 104 may be formed by a molding and thermoforming process of thermoplastic material, which may be substantially imperable and imperforate. For example, the thermoplastic materials may include polyolefins such as polypropylene and polyethylene, polystyrene, nylon, and other polymers; and in particular, thermoplastic material may be a bio-based resin, readily recyclable, and/or comprise of at least a portion of recycled material such as a recycled polypropylene base resin.

The filter 106 may have a base 122 that extends upwardly to form a sidewall 124 and then extends outwardly to form an extension 126, which may be defined by one or more sections including a first section 128 and a second section 130. The first extension 128 may define an opening 154 adapted to receive the beverage ingredient 110. The first section may extend outwardly to a predetermined distance indicated by a reference numeral 131, and the second section 130 may extend farther therefrom outwardly in a beveled manner or downward sloping manner relative to the first section 128 towards the base 122. The extension 126 may have a line of weakness 133 between the first and second extensions 128 and 130 to allow the second extension 130 to weaken or separate from the first section 128 along the line of weakness 133, if desired. As discussed in more detail below, the line of weakness may allow the first section 128 to separate more readily from the rim 120 of the container. The first section 128 may extend outwardly at a distance, as indicated by the reference numeral 131, such that the first section 128 may extend farther out laterally than the rim 120 to allow the first section 128 to lay upon or overlap the rim 120 when the filter 106 is placed within the container 104. The base 122 of the filter 106 may have a plurality of holes 136 where the size and number of the holes 136 may be predetermined to control the flow of the beverage through the holes 136 to provide a desired pressure within the filter 106, as discussed in more detail below. The base 122 may also have at least one retainer wall 132 with a plurality of slits 134, as discussed in more detail below.

The container 104 may be adapted to receive the filter 106 and the first section 128 of the extension 126 may be releaseably sealed or adhered to the rim 120 of the container 104 where upon a force applied to the underside of the second section 130, the first section 128 may peel, separate, and/or snap off from the rim 120. In this regard, the releasable bond(s) may be utilized such as the embodiments disclosed in US Published Application No. 2014/0161936, published Jun. 12, 2014, entitled CONTAINER WITH REMOVABLE PORTION by Trombetta et al., which is hereby incorporated by reference in its entirety. Alternatively, the first section 128 of the filter 104 may be ultrasonically sealed to the rim 120 of the container 104 such as the torsional ultrasonic method where high-frequency vibrations are applied tangentially as provided by Telsonic Ultrasonics Inc., located at 14120 Industrial Center Dr., Shelby Township, Mich. 48315 U.S.A.

The distributor 112 may have a base 142 with an outer flap 146 adapted to engage with the inner side 140 of the sidewall 124 of the filter 106 such that the base 142 may be adjacent to the first section 128 of the extension 126. The flap 146 may extend upwardly and/or downwardly to engage with the inner side 140 of the sidewall. The base 142 may have a protrusion 144 extending towards the inner space within the filter 106. The protrusion 144 may form a cavity 162 sized to receive an inlet liquid injection member, as discussed in more detail below, such as an inlet needle to inject heated water into the filter 106. The base 142 may have a plurality of holes 148 to allow the heated water to pass therethrough to substantially distribute the water over the opening 154 of the filter 106. The size of the holes 148 may be less than the average size of the beverage ingredient 110. This may substantially prevent the beverage ingredient 110 from entering the protrusion area 144 thereby substantially preventing the beverage ingredient from clogging the inlet injection member, which can cause the brewing mechanism to malfunction.

The sidewall 124 may have one or more ribs 125 extending outwardly. The extending ribs 125 may be formed on the exterior side 127 of the sidewall 124 adjacent to the extension 126. As the filter 106 is inserted into the container 104, the extending ribs 125 may engage with the sidewall 118 of the container 104 to center the filter 106 relative to the container 104 such that the filter 106 may be substantially aligned with the filter 106 along the axis 102 of the pod 100. The distributor 112 may be placed over the beverage ingredient packed within the filter 106 and the flaps 146 may be engaged or sealed within the interior side 140 of the sidewall 124 of the filter 106 such that the beverage ingredient 110 may be substantially compact between the distributor 112 and the base 122. The distributor 112 may have a flange 146 with cutouts 147 around the circumference of the flange 146 to allow the outer area of the distributor 112 to flex and bend. The protrusion 144 may have an inverted bell like shape to enlarge the area of the cavity 162 adapted to receive the inlet member of the brewing mechanism. The enlarged cavity 162 may also allow the outer area of the distributor 112 to flex and bend more readily.

The manner in which the beverage ingredient is packed within the filter 106 may be predetermined to control the density of the beverage ingredient 110 therein to substantially prevent air pockets, gaps, and channels from forming within the ingredient 110 during manufacturing, shipping, handling, and during the brewing process. As a general rule, beverage ingredient 110 with greater density may require greater pressure to push the heated liquid through the beverage ingredient 110, which can extract more intense flavor from the beverage ingredient 110 in less time. Once the first section 128 of the filter 106 is separated from the rim 120, as discussed in more detail below, the distributor 112 may flex to substantially contain the ingredient 110 within the filter 106 to avoid forming air pockets therein. The lid 114 may be placed over the filter 106 and the outer edge 150 of the lid 114 may be sealed and/or bonded to the first section 128 of the filter 106. In particular, the lid 114 may be formed from a flexible liner with sufficient tensile strength to resist tearing due to the high pressure during the brewing process.

The pressure developed within the beverage ingredient 110 can determine the type of beverage brewed such as coffee under lower pressure and espresso under higher pressure. A number of other factors can determine the pressure developed within the beverage ingredient 110 such as the pressure and temperature of the heated water injected into the beverage ingredient, the grind size and density of the beverage ingredient, the size and number of holes 136 in the base 122 of the filter 106, the depth of the beverage ingredient, and etc. The base 122 may have a predetermined number of holes sized to allow the beverage to pass therethrough but substantially prevent the beverage ingredient packed within the filter 106 from passing through the holes due to pressure within the filter during the brewing process. For instance, the sidewall 124 may be substantially solid to direct most of the beverage, if not all, to pass through the holes 136 on the base 122. Moreover, the stiffeners 125 extending from the sidewall 124 may substantially maintain its shape under the desired brewing pressure conditions. The number and/or size of the holes 136 formed in the base 122 may be predetermined to provide sufficient resistance to flow of beverage to develop the desired brewing pressure within the beverage ingredient to brew a desired beverage. For example, to brew espresso under high pressure from about 6 to 15 bars, the coffee beans may be finely grounded where the average grind size may be from about 40 to about 450 microns, and to brew coffee under low pressure from about 1 to 4 bars, the coffee may be grounded more coarsely where the average grind size may be from about 500 to about 1,000 microns; and to substantially prevent the grinds from passing through the holes, the size of the holes 136 may be less than the average grind size of the coffee grounds. The holes may have a variety of shapes such as circular, square, rectangular, regular and irregular configuration.

Along with the size of the holes 136, the number of holes 136 provided in the base 122 may be predetermined to develop the desired pressure within the filter 106 to brew the intended beverage such as espresso or coffee. That is, the brewing mechanism may inject heated water into the pod 100 at a pressure up to about 19 bars but some of the pressure may be released through the coffee ground and through the filter 106 such that the espresso flavor beverage may be extracted from the finer coffee ground at about 8 bars, for example, with the difference of 11 bars of pressure being released, in this example. That is, the pressure within the filter may largely depend upon the size of the beverage ingredient and the size and number of holes 136. For instance, for low pressure coffee, coarser ground coffee may be packed within the filter 106 and the size and number of holes 136 may be greater than that of the holes 136 to brew espresso, and substantial pressure may be released through the coffee ground and through the filter 106 such that coffee may be extracted from the coarser coffee ground at about 3 bars, for example, with the difference of 16 bars of pressure being released.

In general, for low pressure coffee, the size of the holes 136 may be less than an average grind size or less than the lower end of the distribution of the grind sizes to brew coffee where the average grind size may be from about 450 to about 1,000 microns; and in particular from 500 to about 700 microns. Note that some soluble may have an average grind size of about 1,000 to 2,500 microns. For instance, coffee ground may have grind size distribution from 500 to 700 microns with an average or mean grind size of about 600 microns. With such grind size distribution and average, the size of the holes 136 to brew coffee may be less than about 600 microns or less than 500 microns to substantially prevent coffee ground from passing through the holes and to release the pressure within the coffee grounds to brew coffee. Alternatively, the pod 100 may include a paper filter between the holes 136 and the coffee ground, although not necessary, to allow the beverage to pass while preventing the smaller coffee sediments from passing therethrough during brewing process. Moreover, it is within the scope of the invention to have the size and number of holes 136 in the base 122 to be independent of the grind size of the beverage ingredient 110 where the size of the holes 136 may be sized to substantially prevent the ingredient sediment from passing through the holes 136.

FIG. 1B shows at least one retainer wall 132 extending from the base 122. In particular, the base 122 may have a plurality of retainer walls 132 extending therefrom with layers of retainer walls 132 forming a pathway between two adjacent retainer walls 132, and with a plurality of slits 134 on each of the retainer wall 132, as discussed in more detail below. The retainer walls 132 may have distal ends 135 that contour the shape of the inner side of the base 116 of the container 104.

FIG. 1C shows a cross-sectional view of an assembled pod 100 without the beverage ingredient 110 where the interior of the container 104 may be divided into different chambers including the cavity 162 that extends outwardly to form the gap 161 between the lid 114 and the base 142 of the distributor as discussed above; and a first chamber 164 and a second chamber 166. The first chamber 164 may be generally defined as the interior space of the filter 106 or the space between the distributor 112 and the second chamber 166. The second chamber 166 may be generally defined as the space between the filter 106 and the container 104. The cavity 162 may be adapted to receive an inlet member (not shown) from a high or low pressure brewing mechanism and the heated water from the inlet may flow along the gap 161 to distribute the heated water in a substantially even manner through the holes 148 to more evenly mix with the beverage ingredient 110 to extract the beverage such as espresso or coffee from the ingredient 110. The base 122 of the filter 106 may be in close approximation to the base 116 of the container 104 to enlarge the first chamber 164 to pack about 6 to 18 grams of coffee ground to brew about 0.8 to about 3 oz of espresso or 6 to 14 oz of coffee. The size and number of holes 136 provided on the base 122 may be predetermined to brew a desired beverage such as espresso or coffee. The circumference or diameter of the sidewall 124 of the filter 106 may be less than the circumference or diameter of the sidewall 118 of the container 104 such that a pathway 168 may be provided between the two sidewalls 124 and 118 around the circumference of the sidewall 124 of the filter 106.

The pod 100 may be assembled in a variety of ways. For example, the opening 160 of the container 104 may be sized to receive the filter 106 such that the first section 128 may rest upon the rim 120 of the container 104. The first section 128 may be releasably sealed to the rim 120. The opening 154 of the filter 106 as defined by the first section 128 may receive the beverage ingredient 110 (not shown) and may be tampered to minimize air pockets within the ingredient 110. The distributor 112 may be placed over the ingredient 110 and substantially enclose the opening 154 of the filter 106. The distributor 112 may have a cavity 162 as defined by the protrusion 144 adapted to receive an inlet member to inject liquid therein. Note that it is within the scope of the invention to have the flap 146 extending upwardly from the base 142 such that there is a sufficient distance between the lid 114 and the base 142 such that protrusion 144 and cavity 162 may not be needed. The lid 114 may be placed over the first section 128 and a circumference near the outer edge 150 of the lid 114 may be sealed to the first section 128 to hermetically seal the ingredient 110 within the pod 100. The distributor 112 may have a plurality of ribs (not shown) protruding toward the lid 114 to maintain a gap between the lid 114 and the distributor 112 such that the liquid injected into the cavity 162 may flow along the gap and drain through the holes 148 and mix with the beverage ingredient 110 there-underneath.

Once the pod 100 is assembled, the lid 114 may represent a proximal end, and the base 116 of container 104 may represent a distal end of the pod 100. The pod 100 may have a first pathway 155 along the distal end of the pod, and a second pathway 168 from the distal end to the proximal end of the pod. In particular, the first pathway 155 may be formed between the base 122 of the filter and the base 116 of the container 104, and a second pathway 168 may be formed between the sidewall 124 of the filter and the sidewall 118 of the container. The first pathway 155 may be formed by extending the distal ends 135 of the individual retainer walls 132 from the base 122 such that distal ends 135 may substantially contour the inner side 154 of the base 116 of the container 104 thereby minimizing the gap between the distal ends 135 and the base 116 or have the distal end 135 engage with the base 116 of the container 104. As discussed in more detail below, the individual retainer walls 132 may be spaced apart from each other thereby forming the first pathways 155 between the adjacent walls 132 with the holes 136 formed in the base 122 along the pathway between adjacent walls. In particular, the holes 136 may be formed between adjacent walls 132, and the walls 132 may have the slits 134 to allow the first pathways 155 to traverse across from the inner wall to the outer walls, as discussed in more detail below.

The extending ribs 125 may engage with the sidewall 118 of the container 104 to center the filter 106 relative to the container 104. This may allow the assembled pod 100 to substantially maintain the second pathway 168 that is substantially uniform between the two sidewalls 118 and 124 around the circumference of the sidewall 124. The second pathway 168 may extend from the distal end of the filter to the proximal end of the pod 100. In particular, the sidewall 124 may generally extend upwardly from the base 122 in a taper or expanding manner relative to the longitudinal axis 102, in part, to enlarge the size of the first chamber 164 to be able to pack more beverage ingredient. As the sidewall 124 extends upwardly towards the proximal end of the pod 100, the sidewall 124 may extend in a substantially parallel manner relative to the longitudinal axis 102 to enlarge a gap 163 between the rim 120 and the sidewall 124 at the proximal end. As discussed in more detail below, the enlarged gap area 163 may slow down the flow of the beverage flowing along the second pathway 168 so that the beverage may drain from the pod more smoothly thereby minimizing spattering of the beverage as it drains.

The extending ribs 125 may also engage with the sidewall 118 of the container 104 during the brewing process such that the lateral force applied to the interior side 140 of the sidewall 124 may transfer to the sidewall 118 of the container 104. During the brewing process, the pod 100 may be placed in the brewing chamber (not shown), which includes a holder (not shown) adapted to receive the pod 100. The holder may support the outer contour of the container 104 such as the sidewall 118 and the base 116, which in turn supports the sidewall 124 and the retainer walls 132 of the filter 106. This may substantially prevent the filter 106 from deforming along the sidewall 124 and the base 122 due to the internal high pressure within the filter 106, such as when brewing high pressure beverages like espresso. That is, the extending ribs 125 between the two sidewalls 124 and 118, and the retainer walls 132 between the two bases 122 and 116 may substantially transfer the stress on the filter 106 to the holder in order to substantially maintain the first and second pathways 155 and 168 open. Note that various components of the pod 100 may be assembled in a variety of different orders, and the assembly process is not limited to the steps discussed above.

FIG. 1D shows the pod 100 in a substantially horizontal position in reference to the gravitational direction g, which may be a brewing position of the pod 100. As discussed in more detail below, during the brewing process, the heated water may be injected into the pod 100 through the lid 114 and into the cavity 162 as indicated by the direction arrow 170; and thereafter, the heated water may flow along the following path within the pod 100: (1) as indicated by the direction arrows 172, the protrusion 144 may redirect the heated water towards the lid 114 or the proximal end; (2) as indicated by the direction arrows 174, the heated water may flow along the gap 161 between the lid 114 and the distributor 112 and exit through the holes 148 in the base 142 of the distributor 112 and mix with the beverage ingredient 110 within the first chamber 164; (3) as indicated by the direction arrows 176, the heated water may extract the beverage from the beverage ingredient 110 and the pressure from the heated water injected into the cavity 162 may direct the beverage towards the distal end 122 of the filter 106; (4) as indicated by the direction arrows 178, the beverage may then pass through the holes 136 on the base 122 and flow along the first pathway 155, as discussed in more detail below; and (5) as indicated by the direction arrows 180, with the pod 100 in the substantially horizontal orientation, the gravity may direct the beverage to flow along the second pathway 168, which may be along the six O'clock position of the pod 100 when viewing the first extension 128 as a face on a clock, and the bottom 182 of the first extension 128 may represent the six O'clock position. Note that it is within the scope of the invention to have the pod in a variety of other orientations rather than on a horizontal orientation such as facing downwards or upwards, where in the upward position, the pressure within the pod may force the beverage upwards to drain from the gap.

The external ribs 125 may maintain a uniform second pathway 168 such that the pod 100 may be brewed in any rotational orientation about the first extension 128. In other words, the pod may be inserted into a brewing mechanism in any rotational direction since the gap in the second pathway 168 is substantially similar around the circumference of the two sidewalls 118 and 124. As discussed above, the gap 163 between the proximal end of the sidewall 124 and the rim 120 may be enlarged to slow down the flow of beverage near the proximal end so that the beverage may drain more smoothly from the pod 100 via a gap formed between the extension 126 and the rim 120, as discussed in more detail below. Note that the sidewall 124 of the filter 106 may not have holes to substantially direct the beverage to flow towards the distal end 122 of the filter 106 and substantially prevent the beverage from passing through sidewall 124. However, it is within the scope of the invention to have holes in the sidewall 124 depending on the application. In addition, the distributor 112 may or may not be utilized depending on the application. If the distributor is not utilized, then the heated water from the brewing chamber may be directed towards the beverage ingredient 110.

FIG. 1E illustrates an enlarged view of the base 122 with the plurality of retainer walls 132 protruding therefrom. The plurality of walls 132 may be arranged in a variety of arrangements including in a circular manner with multiple layers of walls 132A, 132B, 132C, and 132D space apart from each other with the holes 136 between two adjacent walls, and the inner holes 136A within the inner wall 132A. Each wall may have a plurality of slits 134 where at least a portion or all of the slits 134 may be arranged to be offset relative to the slits in the adjacent wall such that at least a portion of the slits 134 may be misaligned from the inner wall 132A to the outer walls 132B, 132C, and 132D. In addition, once the pod 100 is assembled, the base 116 of the container 104 may substantially enclose the distal end 135 of the retainer walls 132 such that the beverage may be substantially directed to flow pass the slits 134. Accordingly, as the beverage exits from the holes 136, the beverage may traverse through a number of slits 134 in each layer of walls 132A, 132B, 132C, and 134DA, which may take a variety of different paths. In general, the beverage may take a path of least resistance which may generally define the first pathway 155 such as the exemplary staggered flow patterns indicated by the direction arrows 178. That is, a cumulation of the staggered flow patterns 178 may generally define the first pathway 155 between the two bases 122 and 116.

The flow rate of the beverage flowing along the first pathway 155 may be controlled based on a ratio of number of slits 134 that are aligned relative to the slits 134 that are staggered. That is, a portion of the slits in adjacent walls may be aligned with respect to each other to allow the beverage to take more of a direct path from the inner wall 132A to the outer wall 134D, for example, thereby lessening the restriction to the flow of beverage exiting from the holes 136. Accordingly, the greater the ratio of slits that are aligned relative to the slits that are staggered may increase the flow rate, and vice versa; and this ratio may be predetermined to control the flow rate of the beverage exiting the holes 136 depending on the application. For instance, when the pod 100 is packed with coffee, the coffee ground packed in the first chamber 164 may be coarse, as discussed above, such that the beverage may readily pass through the coffee ground and through the holes 136. When the beverage initially exits the holes 136 along the base 122, the flow rate may be relatively high since the first and second pathways 155 and 168 are free of beverage, and as the beverage pours out of the pod 100 through the gap between the extension 128 and the rim 120, as discussed below, at a relatively high flow rate, the beverage may splatter as it drains and possibly contaminates the brewer and/or the beverage, which may be undesirable. In addition, spattering may also occur during the purging stage when air may be pumped into the pod at the end of the brewing cycle to drain the last remaining beverage out of the pod. By staggering at least a portion of the first pathway 155 in a manner discussed above, the beverage draining from the pod may be slowed to minimize the beverage from spattering.

FIG. 1F shows a cross-sectional view of the filter 106 illustrating the holes 136 in the base 122, and the retainer walls 132A, 132B, 132C, and 132D underneath the base 122 separated from each other to provide the first pathway 155 as discussed above. The size and number of holes 136 provided in the base 122 may provide a first stage of filtering the beverage passing through the holes, and the size and number of slits 134 provided in the different layer of the retainer walls 132 may provide at least a second stage of filtering the beverage passing through the first pathway 155, thereby minimizing the sediments in the beverage, along with controlling the speed of the beverage flowing along the first pathway 155. As discussed above in reference to the pod 100, for coffee, an average grind size may be from about 450 to 700 microns, and for espresso, an average grind size may be from about 40 to 400 microns such that the size of the holes 136 may be smaller than the average grind size or less than the lower end of the distribution of the grind sizes to brew coffee, or sized to substantially prevent the average grind size of the beverage ingredient from passing through the hole 136 by having at least one of the dimensions of the hole be less than the average grind size. With such distribution of average grind sizes, the size of the holes 136 to brew coffee may be less than about 450 microns to substantially prevent coffee ground from passing through the holes 136 and to release the pressure within the coffee grounds to brew coffee. With such average grind size of the coffee ground, the hole 136 may be formed from a variety of configurations such as circular, oval, square, rectangle, triangle, or any other regular or irregular shape or any other shape known to one skilled in the art where the longest distance defining the hole 136 may be smaller or equal to the average grind size.

Due to the distribution of grind sizes of the beverage ingredient, some of the sediments may pass through the holes 136, to substantially minimize the sediments from draining out of the pod 100, the openings of the slits 134 in the retainer wall(s) 132 may be equal to or smaller than the size of the holes 136, or equal to or smaller than the average grind size of the beverage ingredient. The heated water injected into the filter 106 may be up to 19 or more bars of pressure to brew coffee or espresso depending on how much pressure is released by the pod 100. For example, with the beverage ingredient 110 packed within the first chamber 164 to brew espresso, the pressure within the first chamber 164 may be greater than along the first pathway 155 such that the sediment that may have passed through the holes 136 may not pass through the slits 134 having similar size as the holes 136 or less than the average grind size of the beverage ingredient packed in the first chamber 164. Accordingly, the slits 134 in the retainer wall(s) 132 may provide a second filtering stage for the beverage. In addition, the size of the slits 134 may progressively get smaller from the inner retainer wall 132A to the outer retainer wall 132D, and the number of slits 134 may increase progressively from the inner retainer wall 132A to the outer retainer wall 132D to accommodate more beverage exiting from the outer holes 136. For instance, in reference to FIG. 1E, the beverage passing through the inner holes 136A may pass through the slits 134A in the retainer wall 132A, where the width of the slits 134A may be equal or less than the average grind size of the beverage ingredient or the size of the holes 136A; the beverage passing through the inner holes 136A and 136B may pass through the slits 134B in the retainer wall 132B, where the width of the slits 134B may be equal or less than the average grind size of the beverage ingredient or the width of the slits 134A; the beverage passing through the inner holes 136A, 136B and 136C may pass through the slits 134C in the retainer wall 132C, where the width of the slits 134C may be equal or less than the average grind size of the beverage ingredient or the width of the slits 134B; and the beverage passing through the inner holes 136A, 136B, 136C and 136D may pass through the slits 134D in the retainer wall 132D, where the width of the slits 134D may be equal or less than the average grind size of the beverage ingredient or the width of the slits 134C. As such, as the beverage flows from the inner slits 134A to the outer slits 134 along the first pathway 155, in a staggered manner as discussed above, the smaller sediments may be progressively prevented from passing through as the width of the slits 134 get progressively smaller. Accordingly, the slits 134 may provide multiple layers of filtering to minimize the sediments from draining out of the pod 100.

FIG. 1G shows an enlarged perspective view of the distributor 112 having a base 142 with an outer flap 146 adapted to be received into the opening 154 of the filter 106 and engaged with the inner side 140 of the sidewall 124 of the filter 106, in a manner discussed above. The flap 146 may extend upwardly and/or downwardly relative to the base 142 and have cutouts 147. The base 142 may have a protrusion 144 forming a cavity 162 defining an opening 186 along the base 142. The distributor 112 may have the holes 148 within the protrusion 144 and in the base 142 to allow the heated water to shower the beverage ingredient 110 underneath the distributor 112. The base 142 may have a plurality of radial channels 188 extending from the cavity 162 to the flap 146 to provide a pathway for the water injected into the cavity 162 to flow radially and out of the holes 148. Note that a proximal end 190 of the channel 188 along the cavity 162 may be wider and deeper relative to the channel extending radially to ensure that the water injected into the cavity has a clear passage to the holes 148 in the base 142. The plurality of holes 148 formed on the outer radial portion of the base 142 and the cutouts 147 in the flap 146 may allow the distributor 112 to flex or bend relative to the protrusion 144. FIG. 1H shows a cross-sectional view of the distributor 112 where the flap 146 may also extend upwards where the distal end 192 may be flush with the first extension 128 when the distributor 112 is inserted into the filter 106. As such, once the pod 100 is assembled, as discussed above, the gap 161 may be formed between the lid 114 and the base 142.

FIGS. 2A through 2D show cross-sectional views of the pod 100 in different stages to illustrate a manner and method of brewing a beverage with the pod 100. In this example, FIG. 2A shows the pod 100 in a substantially horizontal position or brewing orientation as discussed above in reference to FIG. 1D, packed with beverage ingredient 110 within the first chamber 164. For example, the beverage ingredient 110 may be coffee ground to brew low pressure coffee with an average coffee grind size from about 500 microns to about 1,000 microns, or brew high pressure espresso with an average coffee grind size from about 40 microns to about 400 microns; and the size and number of holes 136 may be smaller than the average coffee grind size to substantially prevent the coffee ground from passing through the holes 136 in the base 122, but release the pressure within the first chamber 164. In the brewing orientation, the pod 100 may be juxtaposed to an inlet member 200 having an inlet end 202 and a tip 204 with a gasket 206 therebetween. The member 200 may be adapted to slide relative to the pod 100 as indicated by the double ended direction arrow 208, or the pod may be adapted to slide relative to the member 200, or both elements 100 and 200 may be adapted to slide or move relative to each other simultaneously or sequentially. The member 200 may be positioned relative to the pod 100 such that the tip 204 may be juxtaposed to the lid 114 in order to penetrate the cavity 162 of the distributor 112. The pod 100 may also be juxtaposed to a detaching member 210 position behind the second extension 130 at about the six O'clock position 182, as discussed above in reference to FIG. 1D, and in reference to the gravitational direction g. The detaching member 210 and the pod 100 may be adapted to slide relative to each other as indicated by the double ended direction arrow 212 where one or both elements 100 and 210 may move relative to each other simultaneously or sequentially.

FIG. 2B shows that to begin the brewing process, the inlet member 200 may pierce, puncture, or cut through the lid 114, or use any other apparatus or method known to one skilled in the art, and the tip 204 may rest within the cavity 162, and the gasket 206 may engage with the lid 114 surrounding the member 200 to substantially prevent the water from leaking out of the opening between the member 200 the lid 114 formed by the punctured hole within the lid. The detaching mechanism 210 may move towards an extended position as indicated by the direction arrow 212 to engage with the second extension 130 to separate the first extension 128 from the rim 120 near the six O'clock position 182 thereby forming a gap 184 between the extension 126 and the rim 120 that may extend from about four O'clock to about eight O'clock positions; and in particular from about five O'clock to about seven O'clock positions. The second section 130 may taper towards the base 116 of the container 104 such that the underside of the second section 130 may form a concave shape or hook to allow the detaching member 210 to engage with the underside of the second section 130 to separate the first extension 128 from the rim 120 more consistently.

FIG. 2B also shows that the diameter of the gasket 206 may be smaller than the diameter of the opening 186 forming the cavity 162, as discussed above in reference to FIGS. 1G and 1H, such that the force applied by the gasket 206 onto the lid 114 may not directly transfer to the distributor 112 to minimize the resistance upon the extension 126 to allow the detaching mechanism 210 to separate the first extension 128 from the rim 120 and to substantially maintain the gap 184 opening. The newly formed gap 184 may form a part of the second pathway 168 between the two sidewalls 118 and 124 and also between the adjacent extending ribs 125 to allow the beverage formed within the pod 100 to flow along the second pathway 168 and drain through the gap 184, as discussed in more detail below.

Figure 2C:
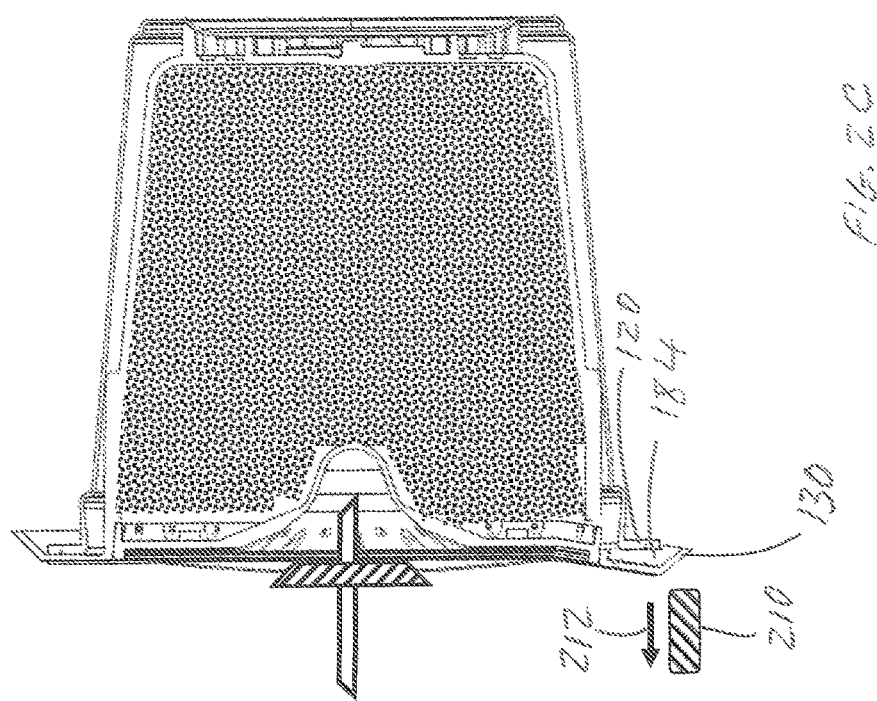
FIG. 2C shows the detaching member on the opposite side of the lid to not interfere with the path of the beverage draining from the gap between the extension and the rim.

FIG. 2C illustrates that as the detaching member 210 moves further towards the inlet member 200 as indicated by the direction arrow 212, the second extension 130 may flex to allow the detaching member 210 to pass and rest on the opposite side of the extension such that the detaching member 210 may not interfere with the beverage draining out of the gap 184. Once the gap 184 is formed, a combination of the rim 120 and the concave shape of second extension 130 that extends downwardly may act as a spout to allow the beverage to pour from the gap 184 in a smooth manner to minimize spattering of the beverage. This may provide a clear path for the beverage to drain from the pod 100 without coming to contact with the brewing mechanism to avoid contaminating the beverage, as discussed in more detail below.

FIG. 2D shows the inlet member 200 injecting heated water 214 into the cavity 162. Depending on the application, the heated water 214 may be provided at a low pressure from about 1 to about 4 bars and/or at a high pressure from about 6 to 15 bars. In reference to FIG. 1D, the heated water 214 may flow along the path as indicated by the direction arrows 172 and 174, and the beverage 196 extracted from the beverage ingredient 110 may flow along the path as indicated by the direction arrows 176, 178, and 180, and drain out of the gap 184 as indicted by the direction arrow 190 and pour the beverage 196 into a mug 194. In particular, the flow of the beverage 196 may be controlled to drain smoothly from the pod 100 based on the following: (1) the beverage 196 flowing along the first pathway 155 may be controlled based on the ratio of the slits 134 in the retainer walls 132 being aligned compared to slits 134 being staggered, as discussed above in reference to FIG. 1E; (2) during the brewing process, the extending ribs 125 may substantially maintain the second pathway 168 uniformly open from the distal end to the proximal end, as discussed in reference to FIG. 1C; (3) the gap 163 in the proximal end of the pod 100 between the rim 120 and the sidewall 124 may be enlarged where the greater opening may slow down the beverage 196 to flow more smoothly near the proximal end along the second pathway 168; and (4) once the gap 184 is formed, the combination of the rim 120 and the concave shape of second extension 130 that extends downwardly may act as a spout to allow the beverage to pour from the gap 184 in a smooth manner to minimize spattering of the beverage. Accordingly, once the beverage 196 passes through the holes 136, the beverage 196 may flow along the first and second pathways 155 and 168, respectively, in a controlled and smooth manner, and also drain smoothly via the gaps 163 and 184 indicated by the direction arrows 178, 180, and 190; and pour into the mug 194 unobstructed by the brewing mechanism to substantially avoid contaminating the beverage and the brewing mechanism. In addition, the slits 134 in the retainer walls 132 may form a second stage or multiple stages of filtering as the beverage 196 flows along the first pathway 155, as discussed above, to brew a more cleaner tasting beverage with less sediment. Accordingly, the pod 100 may be brewed in a substantially horizontal position to brew and drain the beverage from the pod unobstructed by the brewing mechanism.

Figure 3A:
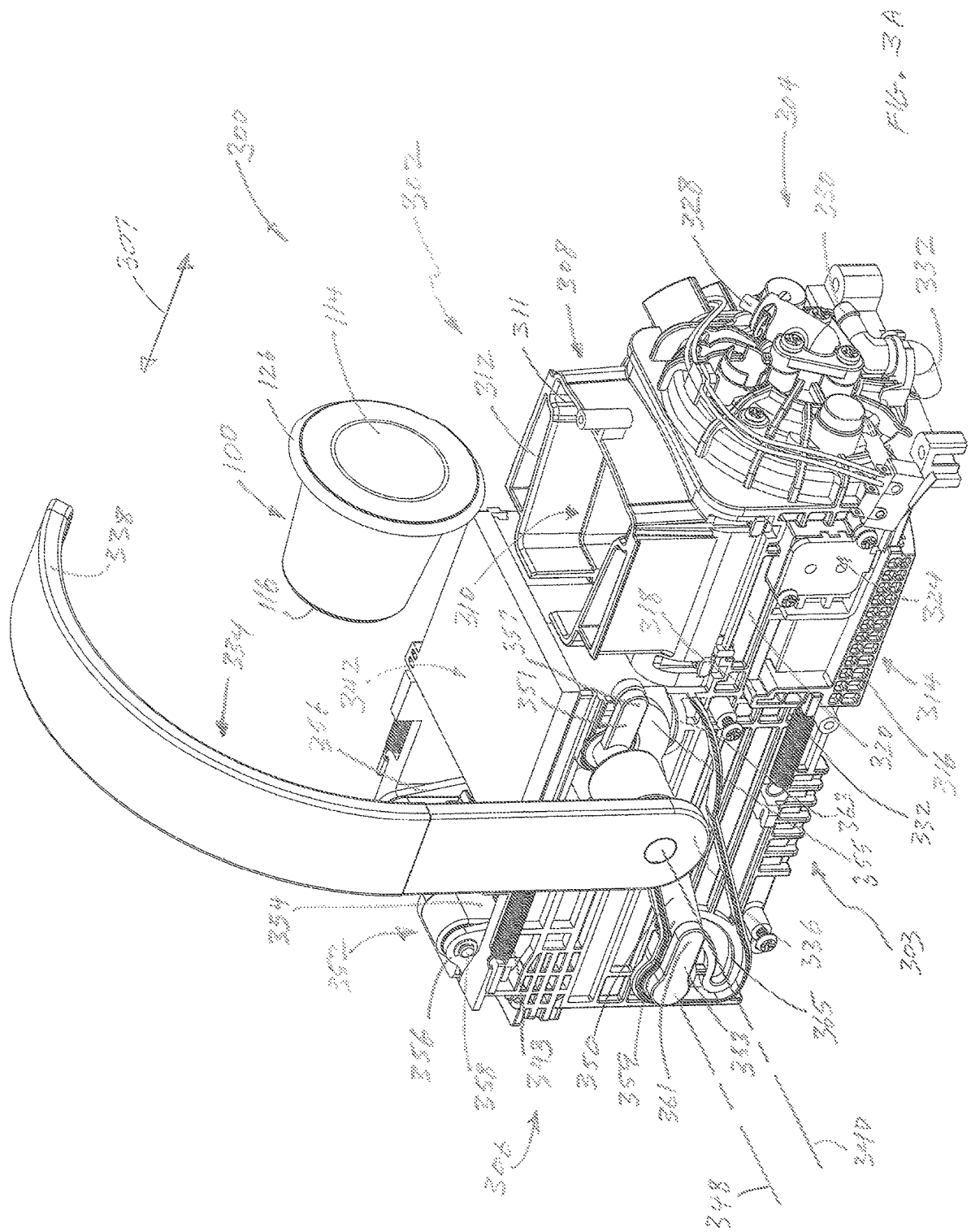
FIG. 3A shows a perspective view of the brewing system including a brewing chamber in a retracted position adapted to receive a pod.

FIG. 3A illustrates a brewing system 300 including a brewing chamber 302 in a retracted or open position adapted to receive the pod 100 to brew a beverage. The brewing chamber 302 may have a housing 303 with a proximal end 304 and a distal end 306 defining a longitudinal axis 307. The brewing chamber 302 may include a guiding member 308 coupled to the upper side of the housing 303 juxtaposed to the proximal end 304. The guiding member 308 may have an opening 310 with an outer configuration 312 that generally conforms to the outer configuration of the pod 100 where the opening 310 may have a channel 311 juxtaposed to proximal end 304 which may have a wider opening to accommodate the extension 126 of the pod 100, and the opening 310 juxtaposed to the distal end 306 may accommodate the base 116 of the pod 100 such that the pod 100 may be received within the guiding member 308 with the lid 114 facing the proximal end 304 in this example. The brewing chamber 302 may also include a detaching member 314 underneath the housing 303 juxtaposed to the proximal end 304. The detaching member 314 may have a sliding member 316 that allows the detaching member 314 to slide between the retracted and extended positions along the longitudinal axis 307. The sliding member 316 may include a tab 318 that protrudes into an elongated opening 320 formed in the housing 303 to slide along the opening 320. The sliding member 316 may be coupled to a bias member 322 to retract the detaching member 314 unless the detaching member 314 is moved by another object as discussed in more detail below. The brewing chamber 302 may also include one or more retaining members 324 underneath the guiding member 308 to receive the extension 126 once the pod 100 is inserted or received into the opening 310. The retaining member 324 may be biased laterally to hold the pod 100 in a close approximation to the inlet member 326, as illustrated in FIG. 3C below, when the brewing chamber 302 is in an open position, and the retaining members 324 may release the extension 126 when the brewing chamber 302 moves towards the closed position to allow the inlet member 326 to penetrate into the cavity 162 of the pod 100, as illustrated for example in Figure F. In this example, a pair of retaining members 324 one on each side of the housing 303 may be utilized to hold the pod 100 juxtaposed to the inlet member 326, as discussed in detail below. The brewing chamber 302 may have a fluid inlet 328 adapted to couple to a tube to receive heated water, which in turn may exit out of the inlet member 326 to inject heated water into the cavity 162. The brewing chamber may also have a second fluid inlet 330 to couple to another tube to receive heated or unheated water to drain out of the outlet 332 and pour into a mug, as discussed in more detail below.

The brewing chamber 302 may also have a handle 334 adapted to move between an open position and a closed position as illustrated in FIGS. 3A and 3F, respectively. The handle 334 may have a proximal end 336 and a distal end 338 where the proximal end 336 may be pivotably coupled to the housing 303 about a first pivot axis 340. As discussed in more detail below, the handle 334 may releasably engage with a cover 342 to cause the cover 342 to slide between an open position and a closed position, as illustrated in FIG. 3F along the longitudinal axis 307. The cover 342 may be coupled to a bias member 343 to provide tension to maintain the cover 342 in a retracted position unless moved towards the extended position. The proximal end 336 of the handle 334 may be coupled to a shaft 346 (as shown in FIG. 3B) about a second pivot axis 348 via a link 350 such that rotating the proximal end 336 of the handle 334 may cause the shaft 346 to rotate as well. The proximal end 336 of the handle 334 may have a first strut 351 and the shaft 346 may have a second strut 353; and the first end 355 of the link 350 may be pivotably coupled to the distal end of the first strut 351 about a pivot axis 357, and the second end 359 of the link 350 may be pivotably coupled to the distal end of the second strut 353 about a pivot axis 361. The housing 303 may have a first semi-circular groove 363 to guide the first end 355 of the link 350 along the groove 363 and a second semi-circular groove 365 to guide the second end 359 of the link 350 along the groove 365. In particular, the first and second struts 351 and 353 may be substantially parallel with respect to each other. This arrangement may allow the handle 334 to rotate between the opened and closed positions where toque on the first link 351 may be applied to the second link 353 via the link 350 such that the shaft 346 may rotate as well at about similar rotational angle, which in turn may cause a cam link 352 to move between the retracted and extended position as well. The shaft 346 may be coupled to the cam links 352 having a first link 354 pivotable coupled to a second link 356 about a pin 358 where rotating the shaft 346 in the clockwise direction may rotate the first link 354 in a clockwise direction as well to cause the first and second links 354 and 356 to move towards an extended position as illustrated in FIG. 3F. Note that in this example, a pair of the first links 354 may be utilized where the second link 356 may be located between two first links 354.

FIG. 3B shows a cross-sectional view of the brewing chamber 302 of FIG. 3A along the longitudinal axis 307 without the pod 100 to show some of the mechanisms in the retracted or open position within the housing 340. The shaft 346 may be coupled to the proximal end 362 of the first link 354 and the distal end 364 may be pivotably coupled to the distal end 366 of the second link 356 by the pin 358; and the proximal end 368 of the second link 354 may be pivotably coupled to the base 370 (as shown in FIG. 3F) of the holder 372 such that actuation of the handle 334 may cause the shaft 346 to rotate in a clockwise or counter-clockwise direction, which in turn may cause the cam links 352 to extend and retract, respectively, thereby causing the holder 372 to extend and retract, respectively, as well, along the longitudinal axis 307, as discussed in more detail below. The holder 372 may have a lip 374, and a sidewall 376 between the base 370 and the lip 374 defining a chamber 378 therein adapted to receive the pod 100, as discussed in more detail below. The interior side of the base 370, sidewall 376, and the lip 374 defining the chamber 378 may be configured to substantially conform with the outer configuration of the pod 100 so that once the pod 100 is within the chamber 378, the holder 372 may support the outer container 104 of pod 100 during the brewing process thereby substantially preventing the filter 106 and the container 104 from expanding due to the pressure within the pod 100.

As indicated in FIG. 3B, the detaching member 314 may have a hook 380 protruding upwards from the base 382 such that the hook 380 may engage with the extension 126 of the pod 100 at about the six O'clock position. The lip 374 may have a cutout 384 between about five and seven O'clock positions to allow the hook 380 to slide along the longitudinal axis 307 underneath the holder 372 and pass along the cutout 384. The holder 372 may also have one or more protrusions 373 adjacent to the cutout 384 extending from the lip 374 to at least partially maintain the gap 184 opened once the hook 380 has separated the extension 126 from the rim 120 as discussed in more detail below in reference to FIG. 3H. In the retracted position, as illustrated in FIG. 3B, the detaching member 314 may be positioned underneath the guiding member 308 such that when the pod 100 is drop or received into the opening 310, the pod 100 may rest within the brewing chamber 302 such that the extension 126 may be held by the retaining member 324 to position the lid 114 and its extension 126 between the hook 380 and the inlet member 326. The sliding member 316 may engage with the underside of the housing 303 adapted to slide therewith, and the tab 318 of the sliding member 316 may extend into the housing 303 such that a ramp 385 (not shown) adjacent to the base 370 may engage with the tab 318 to push the tab 318 along the elongated opening 320 towards the proximal end 304, allowing the holder 372 to move from the retracted position to the extended position, as discussed in more detail below. This action may cause the hook 380 to slide towards the proximal end 304 to engage with the underside of the extension 126 at about the six O'clock position, separating the extension 126 from the rim 120 of the pod 100 to form the gap 184 therebetween, as discussed above by way of example in reference to FIG. 2B.

The housing 303 may also have a stopper 386 extending into the housing, and the lip 374 may have a second cutout 388 aligned with the longitudinal axis 307 with the stopper 386 to allow the holder 372 to move past the stopper 386 as the holder 372 moves from the retracted position to the extended position. In this example, the cutout 388 may be formed on the two and ten O'clock positions of the lip 374, although the cutout 388 may be formed on other locations around the lip 374. As discussed in detail below, after the brewing process has completed, and the handle 334 is moved back from the closed position to the open position, the used pod 100 within the holder 372 may slide back towards the retracted position, and as the pod 100 slides backwards, the stopper 386 may engage with the underside of the extension 126 and extract the pod 100 out of the holder 372 thereby freeing the pod 100 to drop into a waste bin there-underneath. The base 370 of the holder 372 may also have an upright tail 390 aligned along the longitudinal axis 307 to engage with a rib 392 underneath the cover 342 to move the cover 342 towards the proximal end 304 to enclose the opening 310 of the guiding member 308. A bias member 394 may be coupled to the base 370 of the holder 372 to provide sufficient tension to assist with pulling the holder 372 back to the retracted position. In the proximal end 304, the fluid inlet 328 may direct heated water to the inlet member 326, and the second inlet 330 may direct heated or unheated water towards the outlet 332 underneath the housing 303 to pour directly into the mug there-underneath.

FIG. 3C shows a top view of the brewing system 300 of FIG. 3A with the pod 100 within the brewing chamber 302 where the lid 114 of the pod 100 may be juxtaposed to the inlet member 326 ready for a brewing process, as discussed above by way of example in reference to FIG. 2A. In particular, the outer configuration 312 of the opening 310 may conform to the configuration of the pod 100 where the configuration 312 juxtaposed to the proximal end 304 may have the wider channel 311 to accommodate the extension 126 of the pod 100 such that the pod 100 may be received or inserted into the opening 310 with the lid 114 facing towards the proximal end 304 to ensure that the lid 114 is juxtaposed to the inlet member 326 when received within the brewing chamber. The top view also shows the brewing chamber 302 having a pair of retaining members 324 one on each side of the housing 303 and positioned to engage with the extension 126 of the pod 100 juxtaposed to the inlet member 326 to hold the pod 100 below. The retaining members 324 may be biased to move along the lateral direction as indicated by the double ended direction arrows 396. On the distal end 306 side of the brewing chamber 302, the cam links 352 shows the distal end 364 of the first link 354 pivotably coupled to the distal end 366 of the second link 356 by the pin 358; and the proximal end 368 of the second link 356 pivotably coupled to the base 370 along the pivot axis 398. In addition, the ramps 385 may be provided on the opposite sides of the base 370 and adjacent to the pivot axis 398 to engage with their respective tabs 318 to push the tabs 318 along the elongated opening 320 towards the proximal end 304 as the holder 372 moves from the retracted position to the extended position.

FIG. 3D shows a perspective view of the brewing system 300 without the guiding member 308 to better show the pod 100 within the brewing chamber 302, and the handle 334 in a partially closed position where the cutout 388 of the lip 374 has passed the stopper 386 but may not yet have the ramp 385 engaging with the tab 318. Note that FIG. 3D does not show the cover 342 in a partially closed position to better show the holder 372 in a partially extended position in a manner discussed above. In particular, FIG. 3D shows the retaining member 324 adjacent to the extension 126 of the pod 100 to hold the pod 100 in a substantially horizontal position to orient the base 116 of the pod 100 into the chamber 378 of the holder 372. The bias members 343 may engage with the hook 380 to pull the cover 342 towards the distal end 306; and the bias members 322 may engage with the detaching member 314 to pull the member 314 towards the distal end 306 as well. The shaft 346 may be pivotably coupled to the housing 340 along the pivot axis 348 to rotate the first link 354 in a manner discussed above.

FIG. 3E shows a cross-sectional view of the brewing chamber 302 of FIG. 3D along the longitudinal axis 307. In the partially closed position, the lid 114 of pod 100 may be juxtaposed to the inlet member 326 and the hook 380 may be position on the underside of the extension 126, as illustrated by way of example in FIG. 2A. In particular, the extension 126 may be engaged with the retaining members 324, as discussed above in reference to FIG. 3D such that as the chamber 378 of the holder 372 receives the base 116 of the pod 100, the holder 372 may substantially orient the pod 100 along the longitudinal axis 307 and position the pod 100 so that the inlet member 326 may pass through the lid 114 and enter the cavity 162. The inlet member 326 may have a gasket 323 adapted to seal around the inlet member 326 with the lid 114 to substantially prevent fluid escaping from the hole which may have been formed by the inlet member 326 on the lid 114. Moreover, as the handle is moved from an open position to the partially closed position, the shaft 346 may rotate to cause the first and second links 354 and 356 to expand to push the holder 372 to extend towards the proximal end 304 as well.

FIG. 3F shows a cross-sectional view of the brewing chamber 302 along the longitudinal axis 307 with the handle 334 in the closed position and the cam links 352 in the fully extended position. In particular, as the handle 334 moves from the partially closed position as illustrated in FIG. 3E to the fully closed position, the ramp 385 (see FIG. 3C) may engage with the tab 318 to push the tab 318 along the elongated opening 320 towards the proximal end 304, which in turn causes the hook 380 to slide towards the proximal end 304 to engage with the extension 126 at about the six O'clock position and separate the extension 126 from the rim 120 of the pod 100 to form the gap 184 therebetween, as discussed above by way of example in reference to FIG. 2B; and as the hook 380 moves further towards the proximal end 304, the extension 126 may flex to allow the hook 380 to move pass and stop on the opposite side of the extension 126 so that the hook 380 may not interfere with the beverage draining out of the gap 184. That is, as the handle 334 is closed from the open position, the distance traveled by the hook 380 of the detaching member 314 along the longitudinal axis 307 as represented by the double ended direction arrows 381 may be greater than the distance traveled by the extension 126 of the pod 100 as represented by the double ended direction arrows 383 to position the hook 380 from being on the underside of the extension 126 to the opposite side of the extension 126. Once the gap 184 is formed, a combination of the rim 120 and the concave shape of extension 126 may act as a spout to allow the beverage to pour from the gap 184 in a smooth manner to minimize spattering of the beverage, as discussed above in reference to FIGS. 2C and 2D. This may provide a clear path for the beverage to drain from the pod 100 without coming to contact with the brewing chamber 302 to avoid contaminating the beverage, as discussed in more detail below.

FIG. 3F also shows the cam links 352 in the fully extended position where the distal end 366 of the second link 356 may have a footer 367 adapted to engage with a bottom 369 as the cam link 352 reaches the fully extended position. Note that FIG. 3F shows the pivot axis 398 where the proximal end 368 of the second link 354 may be pivotably coupled to the base 370 of the holder 372. In the fully extended position, the first and second links 354 and 356 may be substantially aligned along with their respective pivot axes 346, 358, and 398 where the angle θ between the two links 354 and 356 with respect to the pin 358 may be less than 180° such that during the brewing process, to the extent that the pod 100 exerts pressure upon the holder 372 to press the holder 372 towards the retracted position, the force may be carried along the second link 356 and to the footer 367 due to the angle θ, which is then butted against the bottom 369 thereby substantially preventing the holder 372 from unintentionally retracting. In addition, FIG. 3F shows the upright tail 390 extending from the base 370 engaged with the rib 392 underneath the cover 342 to move the cover 342 towards the proximal end 304 to enclose the opening 310 of the guiding member 308.

FIG. 3G shows an enlarged view of the holder 372 area to illustrate the manner in which the beverage may be brewed within the pod 100 and drained therefrom unobstructed by the brewing chamber 302 as discussed above by way of example in reference to FIG. 2D. In particular, the inlet member 326 may inject heated water into the cavity 162 that flows along the path as indicated by the direction arrows 172 and 174, and the beverage 196 extracted from the beverage ingredient 110 may flow along the path as indicated by the direction arrows 176, 178, and 180, and drains out of the gap 184 as indicted by the direction arrow 190 and pours the beverage 196 into the mug 194. In particular, once the pod 100 is fully received into the holder 372, the outer container 104 may be supported by the holder 372 to substantially minimize the pod 100 from expanding or deforming due to the internal pressure within the pod 100.

FIG. 3H shows the underside of the brewing chamber 302 with the holder 372 in the fully extended position after the hook 380 has separated the extension 126 from the rim 120 to form the gap 184, and with the hook 380 on the opposite side of the lid 114. The underside of the holder 372 may have one or more protrusions 373 and 375 adjacent to the cutout 384 extending from the lip 374 to maintain the gap 184 open once the hook 380 has separated the extension 126 from the rim 120. In this example, a pair of protrusions 373 and 375 may be provided underneath the holder 372 at about four and eight O'clock positions, respectively, or at about the five and seven O'clock positions, respectively, to substantially minimize the protrusions 373 from coming into contact with the beverage draining from the gap 184; and to have the protrusions 373 and 375 remain engaged with the underside of the extension 126 at their respective positions to keep the gap open.

FIG. 3H also shows the detaching member 314 adapted to slide along the underside 315 of the housing 303; and the ramp 385 pushing the tab 318 to slide the detaching member 314 towards the proximal end 304 to allow the hook 380 to separate the extension 126 from the rim 120 as discussed above. The underside view of the brewing chamber 302 also shows the interior of the retaining member 324 adapted to retract along the lateral direction as indicated by the double ended direction arrows 396. The interior of the retaining member 324 may have a first surface 325 and a second surface 327 with a recess 329 therebetween. The recess 329 may be aligned with the channel 311 of the opening 310 to receive the extension 126 when the pod 100 is received or inserted into the opening 310 of the guiding member 308. The first and second surfaces 325 and 327 may be tapered toward the recess 329 formed on the apex where the recess 329 near its underside 331 may be less deep to catch the extension 126 of the pod 100 from falling further into the brewing chamber 302 and engaging with the extension 126 just below the three and nine O'clock positions to hold the pod 100 aligned with the inlet member 326, as discussed above by way of example in reference to FIG. 2A. Note that the second surface 327 may have greater slope than the first surface 325 such that as the holder 372 moves toward the proximal end 304 from the retracted position, the lip 374 may engage with the first surface 325 to cause the retaining member 324 to retract to allow the holder 372 to bypass the retaining member 324 and push the pod 100 towards the proximal end 304 to cause the inlet member 326 to penetrate the lid 114 and into the cavity 162 of the pod 100. The underside 377 of the lip 374 may be tapered as well such that once the holder 372 is in a fully extended position, the retaining member 324 may return to the extended position, as illustrated in FIG. 3H, where the second side 327 may be juxtaposed to the underside 377 of the lip 374. Note that the underside 377 may at least partially engage with the underside 377 to provide sufficient resistance to substantially prevent the holder 372 from unintentionally moving towards the retracted position during the brewing process. Once the handle 334 is moved from the closed position to the open position, the cam links 352 may exert sufficient retraction force upon the holder 372 to cause the retaining member 324 to retract to allow the holder 372 to bypass the member 324 to return to the retracted position.

FIG. 3I shows a cross-sectional view of the brewing chamber 302 returning to a partially open position after the brewing process has been completed with the pod 100 by partially lifting the handle 334. The cross-sectional view shows the interior side of the retaining member 324 with the recess 329 between the first and second surfaces 325 and 327, and a bump 331 on the bottom of the recess 329 where the extension 126 received along the recess 329 may be stopped by the bump 331. In addition, the recess 329 may be aligned with the channel 311 within the guiding member 308 so that the pod 100 received within the opening 310 may be guided by the channel 311, then the recess 329, and stopped by the bump 331 to position the lid 114 of pod 100 juxtaposed to the inlet member 326 with the hook 380 underneath the extension 126 in a manner discussed above by way of example in reference to FIG. 2A. Note that in the fully extended position as illustrated in FIG. 3F, the hook 380 may be on the top side of the lid 114 such that as the holder 372 returns to the retracted position, the hook 380 may not interfere with the pod 100 within the holder 372 returning to the retracted position. Also, as the handle is lifted towards the partially open position to return the holder 372 to the retracted position, the bias member 322 may retract the detaching member 314 to the retracted position, the bias member 343 (shown in FIG. 3D) may retract the cover 342 to the retracted position, and the bias member 322, and the bias member 394 may retract the cam links 352 to the retracted position, as well.

FIG. 3J shows the handle 334 in a fully open position. And as the holder 372 moves from the partially retracted position, as illustrated in FIG. 3I, to the fully retracted position, the stopper 386 may pass through the cutout 388 on the lip 374, but engage with the underside of the extension 126 to disengage the pod 100 from the holder 372 thereby substantially freeing the pod 100. The bottom 309 of the chamber 302 underneath the pod 100 after it has disengaged from the holder 372 may be opened to allow the pod 100 to fall into a waste bin to collect the used pods therein. FIG. 3J also shows the interior side of the retaining member 324 removed to show the bias member 333 to move the interior side of the retaining member 324 laterally as indicated by the double ended direction arrows 396.

While various embodiments of the invention have been described, it will be apparent to those ordinarily skilled in the art that many more embodiments and implementations are possible within the scope of this invention. Moreover, various features and functionalities described in this application and Figures may be combined individually and/or with a plurality of features and functionalities with others. Accordingly, the invention is not to be restricted except in light of the attached claims and their equivalents.

What is claimed is:

1. A brewing chamber adapted to be in a retracted position and an extended position, the brewing chamber adapted to receive a pod in the retracted position and form a gap between an extension of a filter and a rim of an outer container as the brewing chamber goes from the retracted position to the extended position, the brewing chamber comprising:
   a retaining member having a recess adapted to receive the extension of the pod and holds the pod in an at least approximately horizontal position in the retracted position; and
   a hook adapted to move between the retracted position and the extended position, the hook juxtaposed to an underside of the extension of the filter in the retracted position when the retaining member receives the pod, and when the hook moves from the retracted position to the extended position, the hook engages with the underside of the extension of the filter to separate the extension of the filter from the rim to form the gap therebetween;
   wherein the hook moves past the extension of the filter after the gap is formed and the hook stops on an opposite side of the extension of the filter in the extended position to provide an unobstructed path from the gap to a mug thereunderneath;
   wherein the brewing chamber further includes a holder adapted to move between the retracted and extended positions, and as the holder moves towards the extended position, the holder moves the hook towards the extended position to cause the hook to separate the extension of the filter from the rim to form the gap;
   wherein the holder has at least one protrusion to engage with the underside of the extension of the filter in the extended position to maintain the gap open;
   wherein the holder has a lip and two protrusions on a bottom side of the holder to engage with the underside of the extension of the filter in the extended position to maintain the gap open at about a six o'clock position of the lip;
   wherein the brewing chamber has a proximal end and a distal end defining a longitudinal axis therebetween, and further including an inlet member juxtaposed to the proximal end, and a holder adapted to move between the retracted and extended positions, where the holder is adapted to receive the pod as the holder moves from the retracted position towards the extended position to move the extension of the pod towards the inlet member, and a distance traveled by the hook from the retracted position to the extended position along the longitudinal axis is farther than a distance traveled by the extension such that the hook passes the extension and is located between the proximal end and the extension in the extended position;
   wherein the chamber further includes a handle adapted to move between an open position and a closed position, the handle mechanically coupled to the hook such that moving the handle from the open position to the closed position causes the hook to move from the retracted position to the extended position, and vice versa;
   wherein the brewing chamber further includes an inlet member, a stopper, and a holder, the holder adapted to move between the retracted and extended positions, where the holder bypasses the stopper and receives the pod as the holder moves from the retracted position towards the extended position to move the extension of the pod towards the inlet member, and as the holder returns from the extended position to the retracted position, the stopper engages with the extension to disengage the pod from the holder to free the pod from the holder;
   wherein the brewing chamber further includes an inlet member adapted to inject heated water and a holder adapted to move between the retracted and extended positions, as the holder moves from the retracted position to the extended position, the holder moves the pod towards the inlet member to be pierced by the inlet member and receives the heated water to brew a beverage within the pod and drains the beverage via the gap; and
   wherein the hook moves past the extension to be on an opposite side of the underside of the extension so that the beverage drains from the gap unobstructed by the hook.

* * * * *